(12) United States Patent
Wu et al.

(10) Patent No.: US 12,399,407 B2
(45) Date of Patent: Aug. 26, 2025

(54) DISPLAY PANEL AND DISPLAY DEVICE

(71) Applicant: Xiamen Tianma Micro-Electronics Co., Ltd., Xiamen (CN)

(72) Inventors: Hao Wu, Xiamen (CN); Renliang Zhu, Xiamen (CN); Poping Shen, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 154 days.

(21) Appl. No.: 18/137,328

(22) Filed: Apr. 20, 2023

(65) Prior Publication Data

US 2024/0248358 A1 Jul. 25, 2024

(30) Foreign Application Priority Data

Jan. 19, 2023 (CN) .......................... 202310074188.3

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01); *G02F 1/136222* (2021.01); *G02F 1/136227* (2013.01)

(58) Field of Classification Search
None
See application file for complete search history.

(56) References Cited

U.S. PATENT DOCUMENTS

| 9,218,080 B2 * | 12/2015 | Oh | G02F 1/13338 |
| 2015/0243719 A1 * | 8/2015 | Kwon | H01L 27/1248 |
| | | | 257/43 |
| 2018/0217431 A1 * | 8/2018 | Baba | G02F 1/136286 |

FOREIGN PATENT DOCUMENTS

| CN | 107179639 A | 9/2017 |
| CN | 113809098 A | 12/2021 |

* cited by examiner

*Primary Examiner* — Dung T Nguyen
(74) *Attorney, Agent, or Firm* — Anova Law Group, PLLC

(57) ABSTRACT

A display panel and a display device are provided. The display panel includes a plurality of data lines and a plurality of scan lines. An extending direction of the plurality of data lines intersects an extending direction of the plurality of scan lines. The plurality of scan lines includes at least one first scan line. The first scan line includes a first portion. Metal conductivity of the first portion is greater than or equal to metal conductivity of the plurality of data lines.

12 Claims, 22 Drawing Sheets

B-B

DISPLAY PANEL AND DISPLAY DEVICE

CROSS-REFERENCE TO RELATED APPLICATION

This application claims priority of Chinese Patent Application No. 202310074188.3, filed on Jan. 19, 2023, the entire content of which is hereby incorporated by reference.

FIELD OF THE DISCLOSURE

The present disclosure generally relates to the field of display technology and, more particularly, relates to a display panel and display device.

BACKGROUND

From an era of cathode ray tube (CRT) display to an era of liquid crystal display (LCD), and now to an era of organic light-emitting diode (OLED) display and an era of light-emitting diode (LED) display, display industry has experienced decades of development and is developing quickly. Display industry is closely related to our life. From conventional mobile phones, tablets, TVs, computers, to current smart wearable devices, virtual reality devices, vehicle display devices and other electronic devices, display technology is indispensable.

With the development of display technology, people have higher requirements for display quality of display products. When a load of at least a part of scan lines in a display panel increases, display uniformity of sub-pixels in the display panel may be affected. As such, how to effectively reduce loads on scan lines and improve display uniformity has become one of technical problems to be addressed urgently at the present stage.

SUMMARY

One aspect of the present disclosure includes a display panel. The display panel includes a plurality of data lines and a plurality of scan lines. An extending direction of the plurality of data lines intersects an extending direction of the plurality of scan lines. The plurality of scan lines includes at least one first scan line. The first scan line includes a first portion. Metal conductivity of the first portion is greater than or equal to metal conductivity of the plurality of data lines.

Another aspect of the present disclosure includes a display device. The display device includes a display panel. The display panel includes a plurality of data lines and a plurality of scan lines. An extending direction of the plurality of data lines intersects an extending direction of the plurality of scan lines. The plurality of scan lines includes at least one first scan line. The first scan line includes a first portion. Metal conductivity of the first portion is greater than or equal to metal conductivity of the plurality of data lines.

Other aspects of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
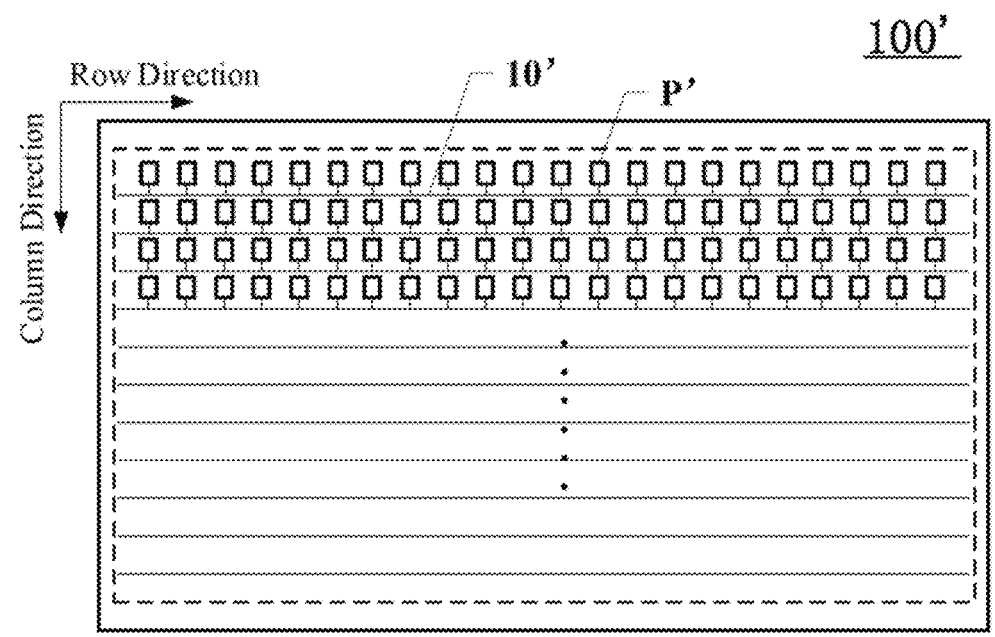
FIG. 1 illustrates a schematic structural diagram of a display panel.

To make the objectives, technical solutions and advantages of the present disclosure clearer and more explicit, the present disclosure is described in further detail with accompanying drawings and embodiments. It should be understood that the specific exemplary embodiments described herein are only for explaining the present disclosure and are not intended to limit the present disclosure.

Technologies, methods, and equipment known to those of ordinary skill in relevant fields may not be discussed in detail, but where appropriate, these technologies, methods, and equipment should be regarded as part of the specification.

In the present disclosure, any specific values should be construed as exemplary only, and not as limitations. Different embodiments may have different values.

Reference will now be made in detail to embodiments of the present disclosure, which are illustrated in the accompanying drawings. Similar labels and letters designate similar items in the drawings. Once an item is defined in one drawing, the item may not be defined and discussed in subsequent drawings.

FIG. 1 illustrates a schematic structural diagram of a display panel provided by conventional technology. The display panel 100' is a widescreen display panel, that is, a length in a row direction is greater than a length in a column direction. In this configuration, a scan line 10' has a greater length, a quantity of sub-pixels P' connected to a scan line 10' may be large, and a load of the scan line may be heavy. When a driving signal is transmitted to the sub-pixels P' connected to the scan line 10' through the scan line 10', since the load of the scan line may be heavy, the driving signal may suffer a large loss during transmission. As a result, the driving signals received by different sub-pixels P' connected to the scan line 10' may be different, and overall display uniformity of the display panel may thus be affected.

Figure 2:
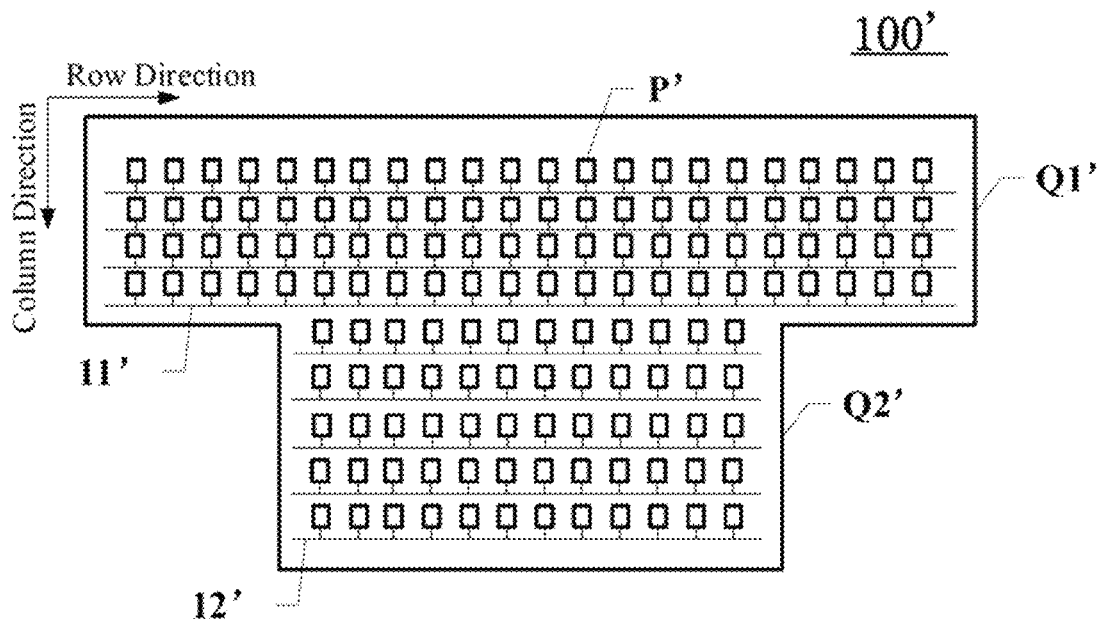
FIG. 2 illustrates another schematic structural diagram of a display panel.

FIG. 2 illustrates another schematic structural diagram of a display panel provided by conventional technology. The display panel 100' is a special-shaped display panel, and a display panel with a T-shaped structure is taken as an example for illustration. The display panel 100' includes a first region Q1' and a second region Q2' arranged in a column direction. A width of the first region Q1' along the row direction is greater than a width of the second region Q2' along the row direction. A quantity of the sub-pixels P' connected to the first scan line 11' in the first area Q1' is greater than a quantity of the sub-pixels P' connected to the second scan line 12' in the second area Q2'. The load of the first scan line 11' is greater than the load of the second scan line 12'. When the loads of the scan lines in the first area Q1' and the second area Q2' are inconsistent, the driving capability of the driving signal to the sub-pixels P' connected to the first scan line 11' and the driving capability of the driving signal to the sub-pixels P' connected to the second scan line 12' may be different. Accordingly, a problem of uneven display in the first area Q1' and the second area Q2' may arise.

The present disclosure provides a display panel. The display panel includes a plurality of data lines and a plurality of scan lines. An extending direction of the data lines intersects an extending direction of the scan lines. The scan lines include at least one first scan line, and the first scan line includes a first portion. Metal conductivity of the first portion is greater than or equal to metal conductivity of the data lines. When the metal conductivity of the first portion in the first scan line is set to be greater than or equal to the metal conductivity of the data line, the overall metal conductivity of the first scan line may increase. When the overall metal conductivity increases, the overall impedance of the first scan line may decrease. As such, the load on the first scan line may be reduced, the driving capability and driving uniformity to the sub-pixels connected to the first scan line may be improved. Accordingly, the display uniformity of the product may be improved.

Figure 3:
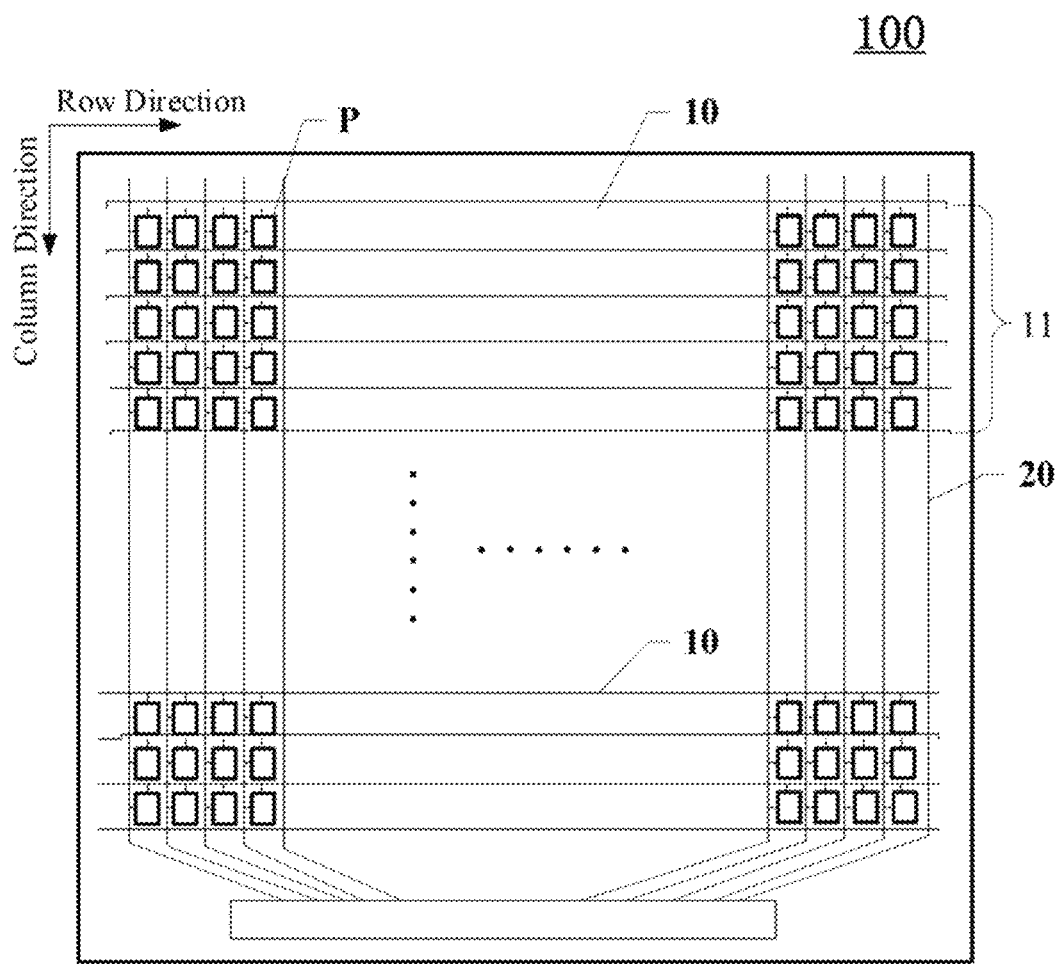
FIG. 3 illustrates a schematic structural diagram of a display panel consistent with the disclosed embodiments of the present disclosure.
Figure 4:
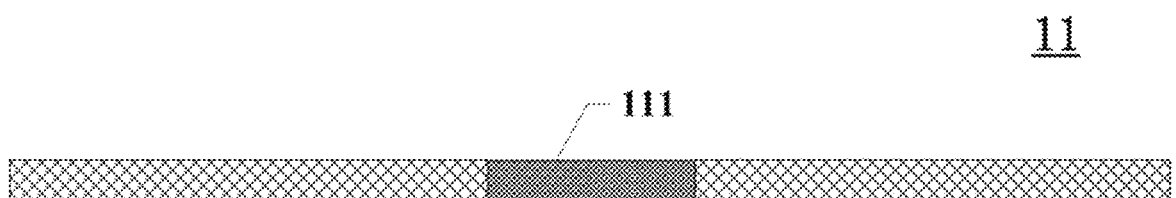
FIG. 4 illustrates a schematic structural diagram of a first scan line in a display panel consistent with the disclosed embodiments of the present disclosure.

FIG. 3 illustrates a schematic structural diagram of a display panel consistent with the disclosed embodiments of the present disclosure. FIG. 4 illustrates a schematic structural diagram of a first scan line in a display panel consistent with the disclosed embodiments of the present disclosure. Referring to FIG. 3, the present disclosure provides a display panel 100. The display panel 100 includes a plurality of data lines 20 and a plurality of scan lines 10. An extending direction of the data lines 20 intersects an extending direction of the scan lines 10. The scan lines 10 include at least one first scan line 11, and the first scan line 11 includes a first portion 111. Metal conductivity of the first portion 111 is greater than or equal to metal conductivity of the data line 20.

It should be noted that FIG. 3 only uses a display panel with a rectangular structure as an example for illustration, and does not limit shapes of the display panel. In some other embodiments of the present disclosure, the display panel may have other shapes, such as rounded rectangle, circle or other feasible shapes. FIG. 3 schematically illustrates the sub-pixels included in the display panel, and does not limit the quantity, arrangement, shape and size of the sub-pixels actually included in the display panel. Optionally, in the display panel provided by the present disclosure, the scan lines 10 extend along the row direction, and the data lines 20 extend along the column direction.

It should be noted that, the scan lines 10 and the data lines 20 in FIG. 3 are described by taking a straight-line structure as an example. The present disclosure does not limit actual line shapes of the scan lines 10 and the data lines 20, provided that the overall extending direction of the scan lines 10 is the row direction and the overall extending direction of the data lines 20 is the column direction. As such, the scan lines 10 and the data lines 20 may not have a straight-line structure in a strict sense. FIG. 3 only illustrates a part of the scan lines 10 and data lines 20 in the display panel, and does not represent the actual quantities of the scan lines 10 and the data lines 20 included in the display panel. In FIG. 4, to illustrate a positional relationship between the first scan line 11 and the first portion 111 thereof, the first portion 111 in the first scan line 11 has a different filling. The different filling does not limit a specific material or structure of the first scan line 11.

Still referring to FIG. 3, the display panel provided by the present disclosure includes a plurality of data lines 20 and a plurality of scan lines 10. The extending directions of the data lines 20 and the scan lines 10 intersect. The scan lines 10 include at least one first scan line 11. The first scan line 11 includes a first portion 111, and the first portion 111 may be understood as at least a part of line segments in the first scan line 11. In particular, the present disclosure sets the metal conductivity of the first portion 111 in the first scan line 11 to be greater than or equal to the metal conductivity of the data line 20. Accordingly, the overall metal conductivity of the first scan line 11 may be increased, and the overall impedance of the first scan line 11 may thus be reduced.

Optionally, one scan line 10 may be electrically connected to a plurality of sub-pixels P. When the overall impedance of the first scan line 11 is reduced, difference in the driving signals received by different sub-pixels connected to the first scan line 11 may be reduced. As such, while the driving capability may be improved, the driving uniformity and the overall display uniformity may also be improved.

The present disclosure does not limit the structure of the data lines 20. A single data line 20 may be entirely disposed in one film layer. Alternatively, one part of the line segments may be disposed in one film layer, and another part of the line segments may be disposed in another film layer. The present disclosure does not specifically limit whether a single data line 20 is entirely disposed in one film layer.

Optionally, when the metal conductivity of the first portion 111 is greater than the metal conductivity of the data line 20, the overall metal conductivity of the first scan line 11 may be improved. As such, the attenuation of the driving signal transmitted by the first scan line 11 may be reduced, and the display uniformity of the display panel may be improved.

It should be noted that at least one scan line 10 in the display panel may be regarded as the first scan line 11. In one embodiment, only one scan line 10 in the display panel may be regarded as the first scan line 11. In another embodiment, a plurality of the scan lines 10 may be regarded as the first scan lines 11. In another embodiment, each of the scan lines 10 may be regarded as the first scan line 11. The present disclosure does not specifically limit the quantity of the first scan lines 11. When at least a part of the scan lines 10 is regarded as the first scan lines 11, since the overall impedance of the first scan lines 11 may be low, the driving capability and driving uniformity to the sub-pixels connected to the first scan line 11 may be improved, and the overall display uniformity may be improved.

Referring to FIG. 4, in one embodiment, the first portion 111 in the first scan line 11 may be a part of line segments of the first scan line 11. In some other embodiments of the present disclosure, the first portion 111 may be the entire first scan line 11. The present disclosure does not specifically limit whether the first portion 111 is the entire first scan line 11.

Figure 5:
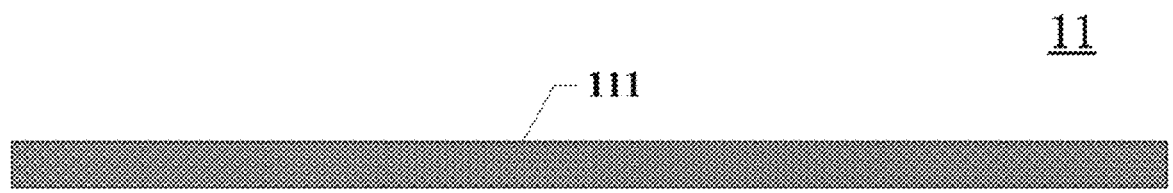
FIG. 5 illustrates another schematic structural diagram of a first scan line in a display panel consistent with the disclosed embodiments of the present disclosure.

FIG. 5 illustrates another schematic structural diagram of a first scan line in a display panel consistent with the disclosed embodiments of the present disclosure. Referring to FIG. 5, in one embodiment, the first scan line 11 is the first portion 111. In FIG. 5, as an example, the filling of the first portion 111 is used to fill the entire first scan line 11. Since the entire first scan line 11 is filled with a same filling, the entire first scan line 11 may be made of a same material.

Metal conductivity characterizes the ability of a metal to conduct electric current. The greater the conductivity, the stronger the ability to conduct electric current. When the scan lines 10 in the display panel have greater conductivity, the scan lines 10 may have better ability for the transmission of the driving signals, and the uniformity of the driving signals transmitted on the scan lines 10 may be better. In the present disclosure, the metal conductivity of the first portion 111 is greater than or equal to the metal conductivity of the data line 20 in the display panel. When the entire first scan line 11 is taken as the first portion 111, the overall metal conductivity of the first scan line 11 may be increased. As such, the overall impedance of the first scan line 11 may be reduced, and the transmission ability of the first scan line 11 for the driving signal may be improved. Accordingly, the driving capability may be improved and the uniformity of the driving capability for the sub-pixels connected to the first scan line 11 may be improved. As a result, the overall display uniformity of the display panel may be improved.

Figure 6:
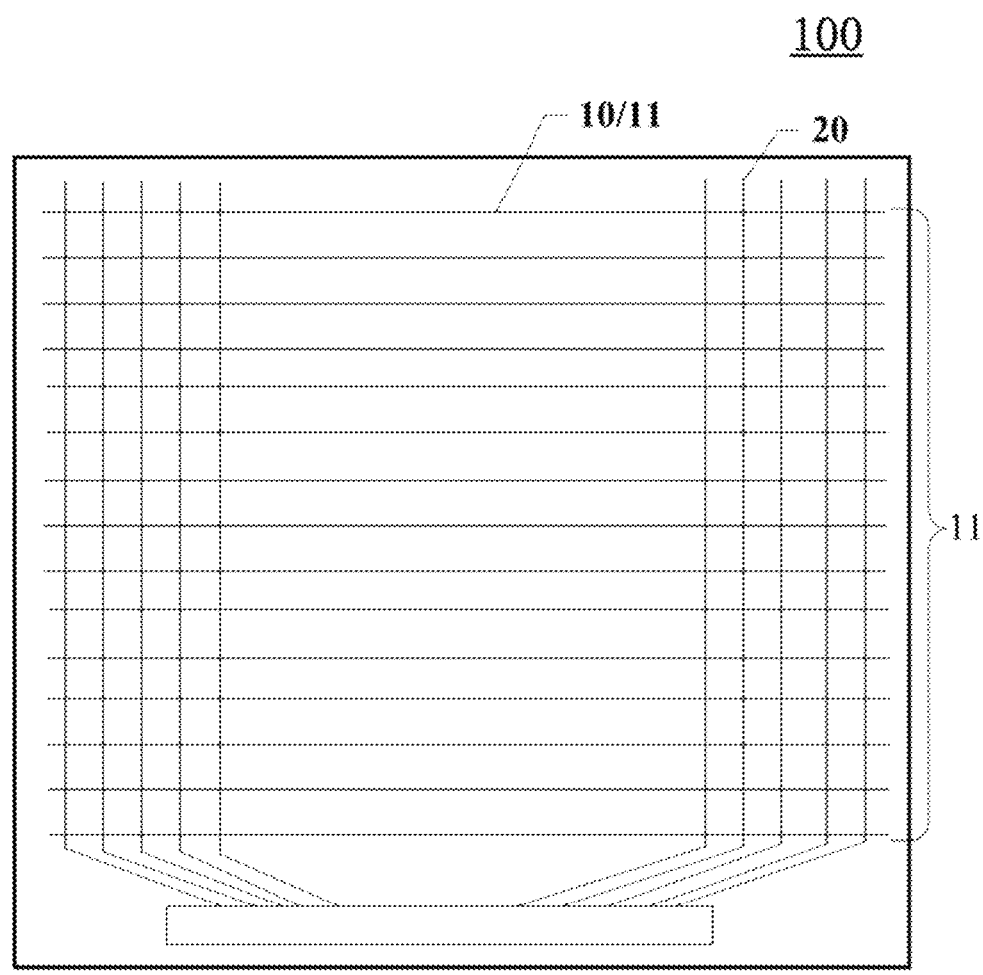
FIG. 6 illustrates another schematic structural diagram of a display panel consistent with the disclosed embodiments of the present disclosure.

It should be noted that, in FIG. 3, only a part of the scan lines 10 in the display panel are taken as the first scan lines 11. When this part of the scan lines 10 is used as the first scan lines 11, the driving capability and display uniformity for the sub-pixels connected to this part of the scan lines 10 may be improved. In some other embodiments of the present disclosure, each scan line 10 in the display panel may be used as the first scan line 11. FIG. 6 illustrates another schematic structural diagram of a display panel consistent with the disclosed embodiments of the present disclosure. The difference between FIG. 6 and FIG. 3 is that, each scan line 10 in FIG. 6 is the first scan line 11, and a part of the scan lines 10 in FIG. 3 is the first scan lines 11.

Still referring to FIGS. 4-6, in one embodiment, each scan line 10 in the display panel is the first scan line 11. Since the metal conductivity of the first portion 111 in the first scan line 11 is greater than or equal to the metal conductivity of the data line 20, the overall metal conductivity of the first scan line 11 is higher. When each scan line 10 in the display panel is set as the first scan lines 11, the impedance of each scan line 10 in the display panel may be reduced, and the driving capability of the driving signal on each scan line 10 to the sub-pixels connected to each scan line 10 may be improved. Accordingly, the display uniformity of the sub-pixels in different regions of the display panel may be improved, and the overall display effect of the display panel may be improved.

Figure 7:
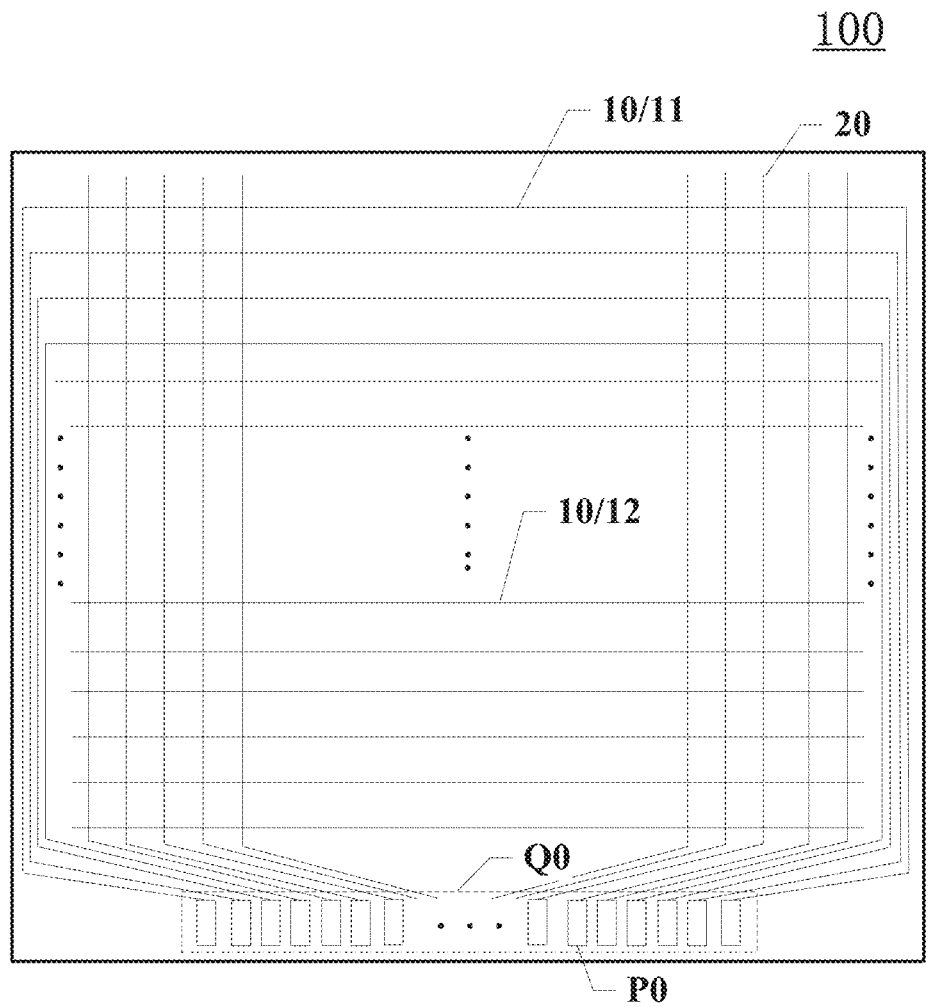
FIG. 7 illustrates another schematic structural diagram of a display panel consistent with the disclosed embodiments of the present disclosure.

FIG. 7 illustrates another schematic structural diagram of a display panel consistent with the disclosed embodiments of the present disclosure. Referring to FIG. 7, in one embodiment, a bonding area Q0 is disposed on one side of the display area. The bonding area Q0 includes a conductive pad P0. The conductive pad P0 is connected to the scan line 10.

Referring to FIGS. 4, 5 and 7, in one embodiment, the display panel also includes a bonding area Q0. The bonding area Q0 includes a plurality of conductive pads P0. The conductive pads P0 are electrically connected to the scan lines 10. The display panel also includes a second scan line 12. The second scan line 12 is located between the first scan line 11 and the bonding area Q0 along the extending direction of the data line 20. The metal conductivity of the first portion 111 is greater than or equal to the metal conductivity of the second scan line 12.

Optionally, the conductive pad P0 of the bonding area Q0 is configured for bonding with a control chip. Alternatively, the control chip may be set on a flexible circuit board, and the conductive pad P0 may be configured for bonding with the flexible circuit board. The conductive pad P0 is electrically connected to the scan line through a connection line located in a frame area of the display panel. It should be noted that FIG. 7 only exemplarily shows the connection relationship between a part of the scan lines 10 and a part of the conductive pads P0. The connection relationship between the other part of the scan lines 10 and the other part of the conductive pads P0 may refer to the connection relationship shown in FIG. 7. Signals of the control chip may be transmitted to the scan lines 10 through the conductive pads P0.

In one embodiment, the first scan line 11 refers to the scan line 10 farther away from the bonding area Q0, and the second scan line 12 refers to the scan line 10 closer to the bonding area Q0. A signal of the control chip may be transmitted to the first scan line 11 through the conductive pad P0 and a gate drive circuit. Since the first scan line 11 is farther away from the conductive pad P0, the signal transmission path is relatively long, and the attenuation of the signal may be more severe.

In one embodiment, the scan line 10 farther away from the conductive pad P0 is used as the first scan line 11. Since the metal conductivity of the first portion 111 of the first scan line 11 is relatively large, the overall impedance of the first scan line 11 may be reduced. Accordingly, the attenuation problem that may occur during signal transmission may be made up. The scan line 10 closer to the conductive pad P0 may be used as the second scan line 12. The second scan line 12 may be regarded as a conventional scan line 10. The second scan line 12 is closer to the conductive pad P0, and may have smaller signal attenuation. In one embodiment, by increasing the metal conductivity of the first scan line 11 that is far away from the conductive pad P0, the attenuation difference between the signals transmitted on the first scan line 11 and the second scan line 12 respectively may be reduced, and the overall display uniformity of the display panel may be improved.

Figure 8:
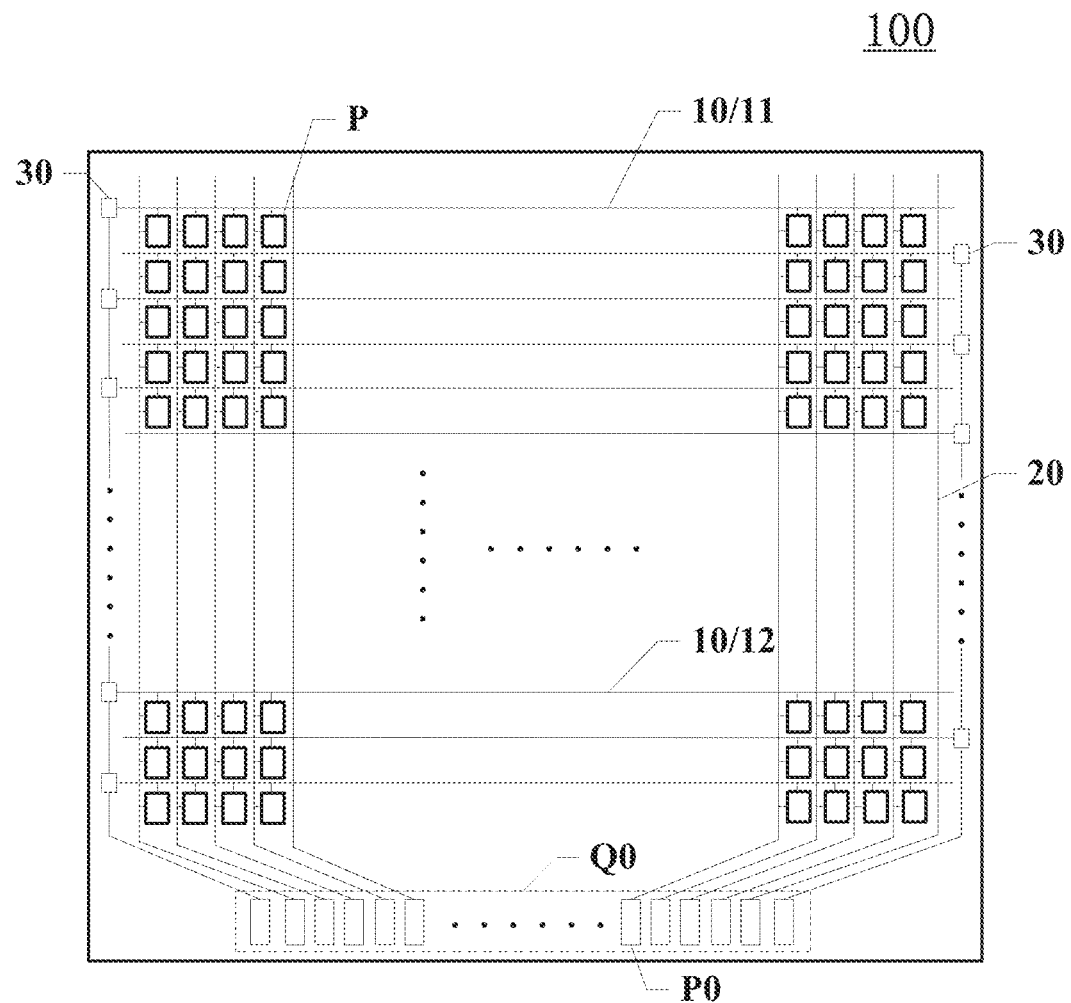
FIG. 8 illustrates another schematic structural diagram of a display panel consistent with the disclosed embodiments of the present disclosure.

In some other embodiments of the present disclosure, the scan line and the conductive pad may also be electrically connected through a gate drive circuit. When the gate drive circuit is used for electrical connection, the load difference between the scan lines closer to the bonding area and the scan lines farther from the bonding area may be small, or negligible. FIG. 8 illustrates another schematic structural diagram of a display panel consistent with the disclosed embodiments of the present disclosure. Referring to FIG. 8, optionally, cascaded gate drive circuits 30 may be disposed on the left and/or right frame area of the display panel. The gate drive circuit 30 is electrically connected to the scan line 10. As shown in FIG. 8, the gate drive circuits 30 may be disposed on the left frame and the right frame of the display panel respectively, and the gate drive circuits 30 may be electrically connected to the scan lines 10 in one-to-one correspondence.

Figure 9:
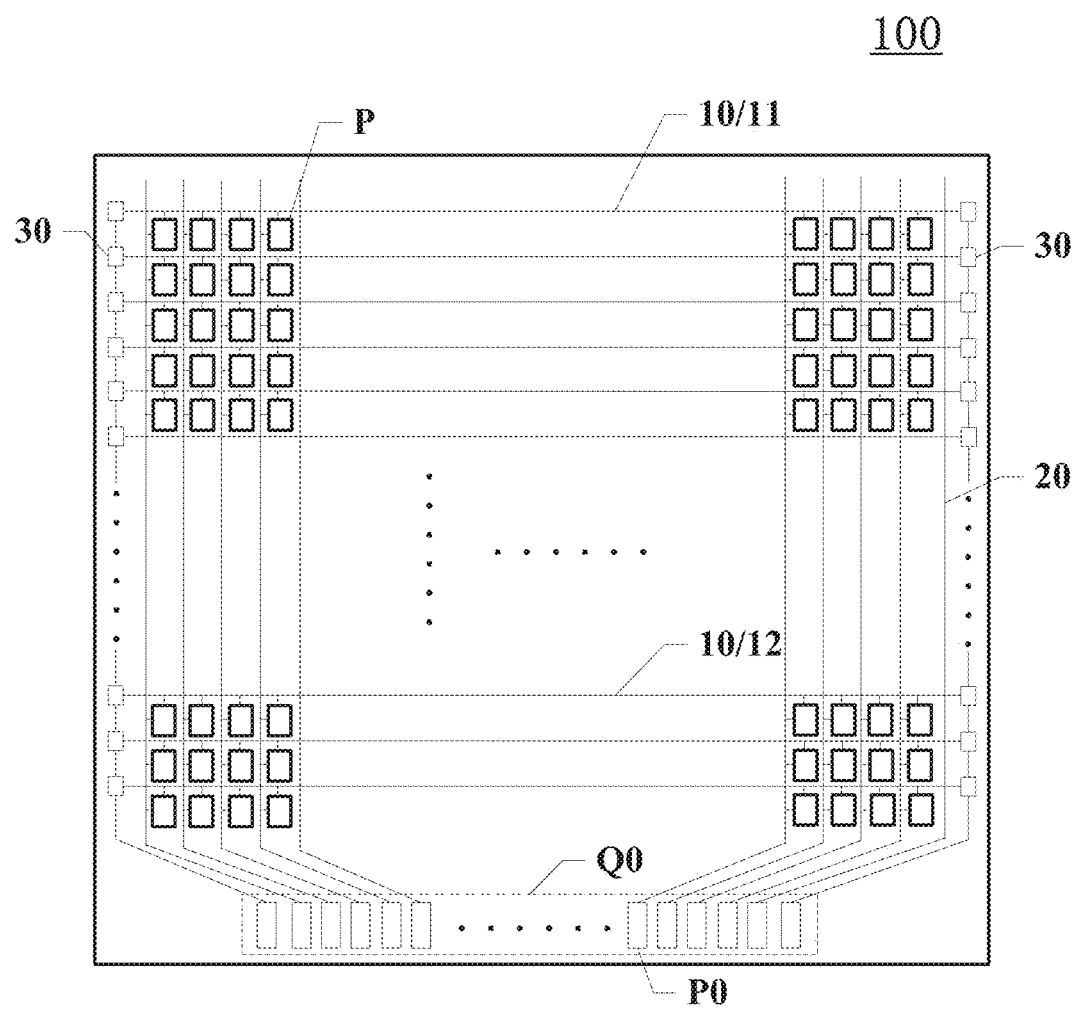
FIG. 9 illustrates another schematic structural diagram of a display panel consistent with the disclosed embodiments of the present disclosure.

FIG. 9 illustrates another schematic structural diagram of a display panel consistent with the disclosed embodiments of the present disclosure. Referring to FIG. 9, in some other embodiments of the present disclosure, two ends of each scan line 10 may be electrically connected to a gate drive circuit 30 respectively. Since the two gate drive circuits 30 are configured to drive the sub-pixels connected to the scan line 10, the driving capability to the sub-pixels may be improved. Referring to FIG. 9, optionally, the scan line 10 may be electrically connected to the conductive pad P0 on the bonding area Q0 through the gate drive circuit 30.

Figure 10:
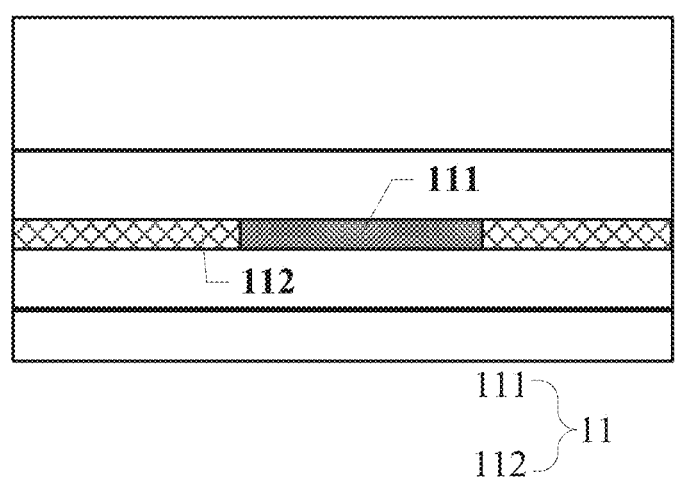
FIG. 10 illustrates a schematic film-layer diagram of a first scan line in a display panel consistent with the disclosed embodiments of the present disclosure.
Figure 11:
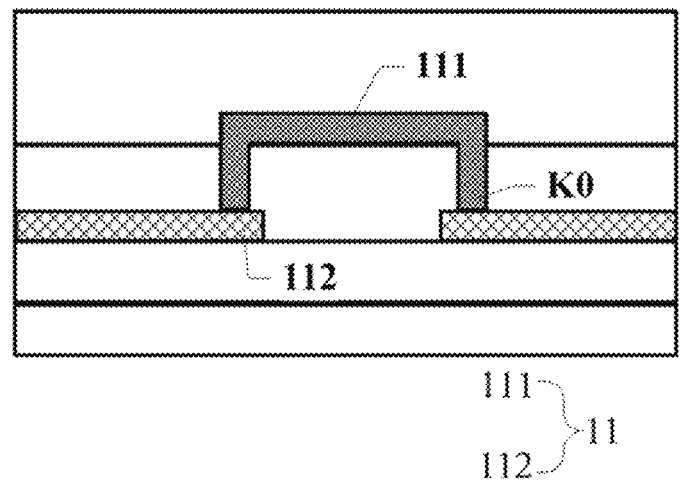
FIG. 11 illustrates another schematic film-layer diagram of a first scan line in a display panel consistent with the disclosed embodiments of the present disclosure.

FIG. 10 illustrates a schematic film-layer diagram of a first scan line in a display panel consistent with the disclosed embodiments of the present disclosure. FIG. 11 illustrates another schematic film-layer diagram of a first scan line in a display panel consistent with the disclosed embodiments of the present disclosure. Two film-layer structures of the first scan line 11 are shown in FIGS. 10 and 11.

Referring to FIG. 10, in one embodiment, the first scan line 11 may also include a second portion 112 connected to the first portion 111. The first portion 111 and the second portion 112 may be disposed on a same layer. Referring to FIG. 11, in another embodiment, the first portion 111 and the second portion 112 are disposed in different layers and are electrically connected through a connection via K0.

Specifically, referring to FIG. 10, the first portion 111 and the second portion 112 in the first scan line 11 are disposed on a same layer. That is, the first portion 111 and the second portion 112 are disposed between the same two insulating layers. In a direction perpendicular to the thickness of the display panel, no other insulating layer is provided between the first portion 111 and the second portion 112. The first portion 111 and the second portion 112 in the first scan line 11 may or may not be made in a same process. Optionally, the first portion 111 and the second portion 112 may be made of different materials in different processes. The metal conductivity of the first portion 111 is greater than the metal conductivity of the second portion 112, such that the first scan line 11 may have a higher overall metal conductivity.

Referring to FIG. 11, the first portion 111 and the second portion 112 in the first scan line 11 are disposed in different layers. That is, in the direction perpendicular to the thickness of the display panel, an insulating layer is provided between the first portion 111 and the second portion 112. The first portion 111 and the second portion 112 are electrically connected by a connection via K0 provided through the insulating layer. Optionally, the first portion 111 is made of a metal material with high metal conductivity. That is, the metal conductivity of the first portion 111 is greater than the metal conductivity of the second portion 112, and the overall metal conductivity of the first scan line 11 may thus be increased. Optionally, a plurality of metal layers may be provided in the display panel. Some of the metal layers have higher metal conductivity, and some of the metal layers have lower metal conductivity. When fabricating the second portion 112, the second portion 112 may be arranged on the film layer with higher metal conductivity. The second portion 112 and wires on the film layer with higher metal conductivity may be fabricated at a same time, and there is no need to introduce a separate film layer for setting up the second portion 112. Accordingly, the overall metal conductivity of the first scan line 11 may be improved without increasing the film-layer structure and manufacturing complexity of the display panel.

Figure 12:
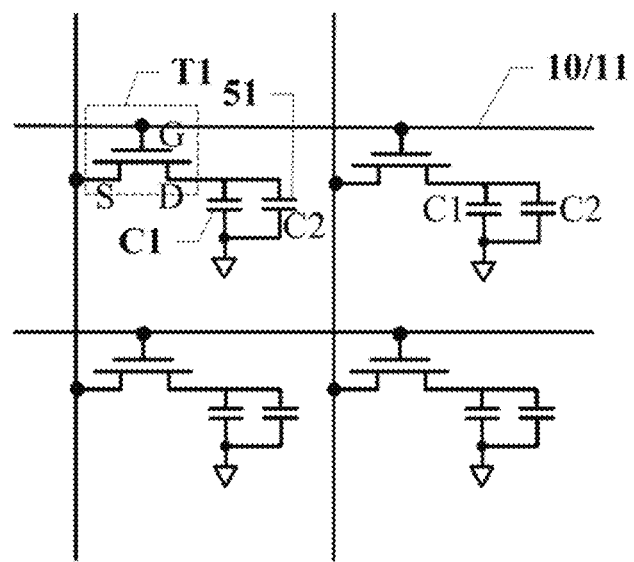
FIG. 12 illustrates a schematic circuit diagram of a pixel circuit in a display panel consistent with the disclosed embodiments of the present disclosure.
Figure 13:
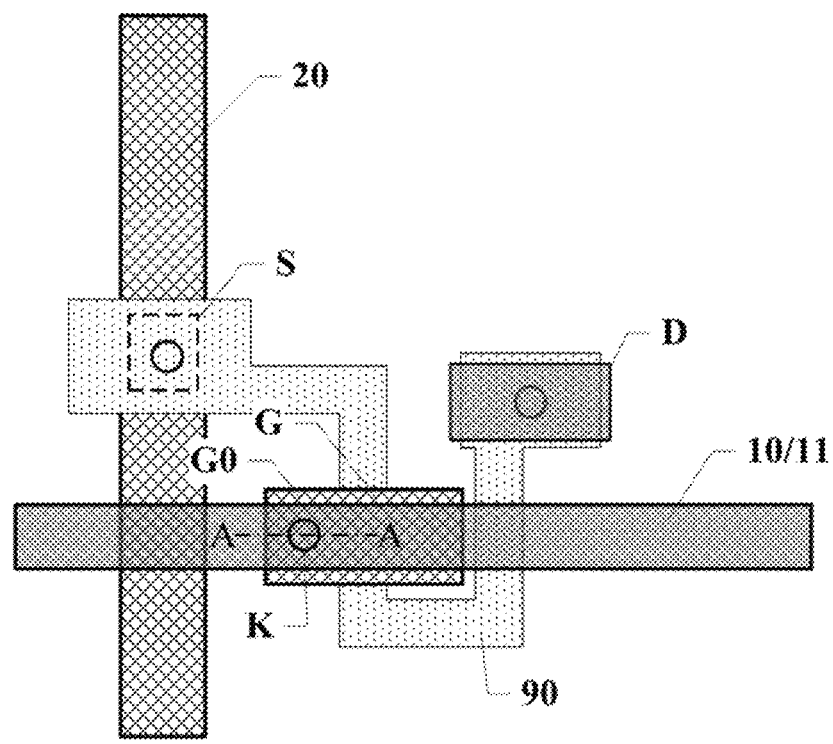
FIG. 13 illustrates a layout diagram corresponding to a single pixel circuit in FIG. 12, consistent with the disclosed embodiments of the present disclosure.

FIG. 12 illustrates a schematic circuit diagram of a pixel circuit in a display panel consistent with the disclosed embodiments of the present disclosure. FIG. 13 illustrates a layout diagram corresponding to a single pixel circuit in FIG. 12. Referring to FIGS. 4, 5, 12, and 13, in one embodiment, the display panel also includes a plurality of first transistors T1 and a plurality of pixel electrodes 51. A gate G of the first transistor T1 is electrically connected to the first scan line 11, a first electrode S of the first transistor T1 is electrically connected to the data line 20, and a second electrode D of the first transistor T1 is electrically connected to the pixel electrode 51. The metal conductivity of the gate G of the first transistor T1 is smaller than the metal conductivity of the first portion 111 of the first scan line 11.

FIG. 12 only shows a schematic diagram of a pixel circuit corresponding to 2*2 sub-pixels. Optionally, the gates G of the first transistors T1 in a same row are connected to a same first scan line 11, and the first electrodes S of the first transistors T1 in a same column are connected to a same data line 20. The second electrodes D of different first transistors T1 are electrically connected to different pixel electrodes 51 respectively. During the operation process of the circuit, the first scan line 11 provides a control signal to the gates G of the first transistors T1 in the same row to control the conduction of the first transistors T1. When the first transistor T1 is turned on, the data signal in the data line 20 is transmitted to the pixel electrode 51 through the first transistor T1 to provide the driving signal for the pixel electrode.

Optionally, the second electrode D of the first transistor T1 is electrically connected to the first capacitor C1 and the second capacitor C2. When the display panel is a liquid crystal display panel, the first capacitor C1 is a liquid crystal capacitor, and the second capacitor C2 is a storage capacitor. The liquid crystal capacitor is a capacitor of the liquid crystal itself in the liquid crystal panel. The storage capacitor is a capacitor formed between a pixel electrode and a common electrode in the display panel. The upper plate of the second capacitor C2 may be regarded as the pixel electrode 51, and the lower plate may be regarded as the common electrode.

In existing technologies, the gate of the first transistor and the corresponding scan line are usually made of a same material and on a same layer. To keep the characteristics of the transistor, the metal conductivity of the gate of the transistor may be set to be low. In this case, the metal conductivity of the scan lines disposed on the same layer may also be low, and the impedance may be large. As such, loss of the driving signal during the transmission process may be large, and display uniformity may be affected.

Referring to FIGS. 4, 5, 12 and 13, in one embodiment, the first scan line 11 includes a first portion 111 with higher metal conductivity. In this way, the overall metal conductivity of the first scan line 11 may be improved, the overall impedance of the first scan line 11 may be reduced, and the display uniformity may be improved. In addition, the metal conductivity of the gate G of the first transistor T1 is lower than the metal conductivity of the first portion 111 of the first scan line 11. When the metal conductivity of the gate G is low, changes in the characteristics of the first transistor T1 may be avoided, and the display effect may not be affected. More detailed analysis is given below.

Figure 14:
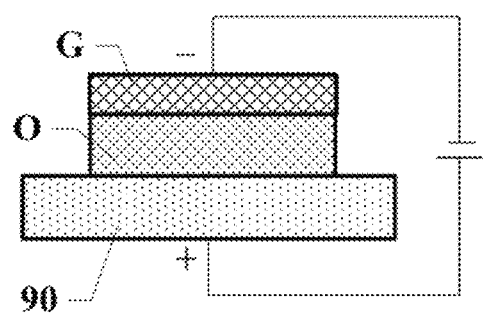
FIG. 14 illustrates a diagram showing a relative positional relationship between a gate, an oxide layer and an active layer in a first transistor structure, consistent with the disclosed embodiments of the present disclosure.

FIG. 14 illustrates a diagram showing a relative positional relationship between a gate, an oxide layer and an active layer in a first transistor structure, consistent with the disclosed embodiments of the present disclosure. The oxide layer O is located between the gate G and the active layer 90 such that the gate G and the active layer 90 are insulated. Optionally, in the first transistor, the active layer may be made of a material including amorphous silicon (a-Si), low-temperature polysilicon (poly-Si), indium gallium zinc oxide (IGZO), or a combination thereof. In one embodiment, the active layer of each first transistor in the display panel is made of a same material. In some other embodiments, the active layers of a part of the first transistors may be made of one material (for example, a-Si or poly-Si), and the active layers of another part of the first transistors may be made of another material (for example IGZO).

Optionally, the oxide layer may include non-metal oxides such as silicon oxide. When the gate metal material is changed, for example, when the gate metal material M0 with low metal conductivity is changed to a metal Ti—Al—Ti with high metal conductivity, the energy level of the gate may change. The interface state between the gate G and the oxide layer O may deteriorate, induction of the active layer 90 to charges may be affected, and characteristics of the first transistor may thus be changed. As a result, the turn-on current Ion of the first transistor may decrease, and the turn-off current Ioff may increase.

Figure 15:
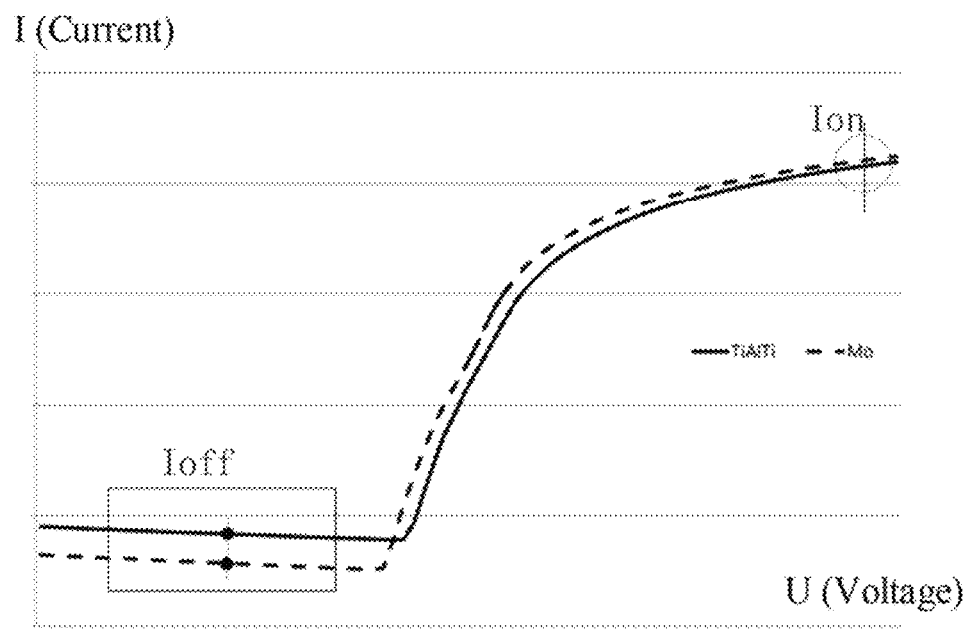
FIG. 15 illustrates a variation comparison diagram of on-current Ion and off-current Ioff of a first transistor when a gate of the first transistor is disposed on different metal layers, consistent with the disclosed embodiments of the present disclosure.

FIG. 15 illustrates a variation comparison diagram of on-current Ion and off-current Ioff of a first transistor when a gate of the first transistor is disposed on different metal layers, consistent with the disclosed embodiments of the present disclosure. The dotted line represents the schematic diagram of the on-current Ion and off-current Ioff of the first transistor when the gate is located on the metal material layer M0 with lower metal conductivity. The solid line represents the schematic diagram of the on-current Ion and off-current Ioff of the first transistor when the gate is located on the metal material layer Ti—Al—Ti with higher metal conductivity. When the gate is located on a film layer with higher metal conductivity, the turn-on current Ion of the first transistor may decrease. At this time, the time for charging the first transistor to make the first transistor turned on may be longer. The deflection of the liquid crystal may be affected, and the display effect of the display panel may thus be affected. In addition, the off-current Ioff of the first transistor may increase. Turning-off of the first transistor may be unreliable, resulting in leakage current. Accordingly, the display effect of the display panel may be affected.

In the present disclosure, the gate of the first transistor is disposed on a film layer with a lower metal conductivity, such that the metal conductivity of the gate of the first transistor is lower than the metal conductivity of the first portion of the first scan line. As such, the interface state between the gate and the oxide layer may be improved, changes in the characteristics of the first transistor may be avoided, and the display effect of the display panel may thus be improved.

Figure 16:
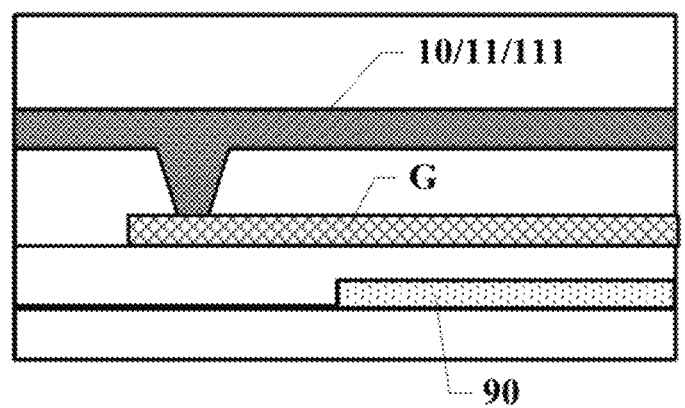
FIG. 16 illustrates a cross-sectional diagram along AA in FIG. 13, consistent with the disclosed embodiments of the present disclosure.

FIG. 16 illustrates a cross-sectional diagram along AA in FIG. 13, consistent with the disclosed embodiments of the present disclosure. Referring to FIGS. 13 and 16, in one embodiment, the gate G of the first transistor T1 and the first portion 111 of the first scan line 11 are disposed in different layers.

Specifically, in one embodiment, the gate G of the first transistor T1 and the first portion 111 of the first scan line 11 are disposed in different layers. The gate G of the first transistor T1 may be disposed in a film layer with lower metal conductivity in the display panel. The first portion 111 of the first scan line 11 may be disposed in a film layer with higher metal conductivity in the display panel. Optionally, the film layer with lower metal conductivity and the film layer with higher metal conductivity are existing film layers in the display panel. In this way, the metal conductivity of the first portion 111 of the first scan line 11 may be set to be higher, by just disposing the first portion 111 of the first scan line 11 on the film layer with a higher metal conductivity in the display panel. An additional film layer may not be needed for the first portion 111. Accordingly, while improving the overall metal conductivity of the first scan line 11, the overall film-layer structure of the display panel may be simplified.

Still referring to FIGS. 13 and 16, in conjunction with FIGS. 4 and 5, in one embodiment, the gate G of the first transistor T1 is connected to the first scan line 11 through a via.

In the present disclosure, the gate G of the first transistor T1 is electrically connected to the first scan line 11, and the on or off signals may be obtained through the first scan line 11. In practical applications, the first portion 111 of the first scan line 11 may be electrically connected to the gate G of the first transistor T1. When the first portion 111 of the first scan line 11 is disposed on a different film layer from the gate G of the first transistor T1, an insulating layer may be disposed between the first portion 111 and the gate G of the first transistor T1. In this case, the first portion 111 of the first scan line 11 may be electrically connected to the gate G of the first transistor T1 through a via penetrating the insulating layer. The connection complexity between the first scan line 11 and the gate G of the first transistor T1 may thus be simplified.

Still referring to FIG. 13, in one embodiment, the gate G of the first transistor T1 includes an extension portion G0. The extension portion G0 is located on at least one side of the gate G along the extending direction of the gate G. Along the thickness direction of the display panel, the first scan line 11 may overlap with the extension portion G0. The first scan line 11 is connected to the extension portion G0 through a via K.

Specifically, in the display panel provided by the present disclosure, the first transistor T1 includes an active layer 90. Along the thickness direction of the display panel, the gate G of the first transistor T1 overlaps with the active layer 90. When the portion of the gate G of the first transistor T1 overlapping with the active layer 90 is regarded as a main body of the gate G, the portion extending from the main body of the gate G may be regarded as the extension portion G0 of the gate G. In one embodiment, the extending direction of the gate G is same as the extending direction of the first scan line 11. Along the thickness direction of the display panel, the first scan line 11 overlaps with the extension portion G0. In this way, along the extending direction of the data line 20, the space occupied by the first scan line 11 and the gate G may be reduced. Accordingly, the space occupied by the first scan line 11 and the gate G of the first transistor T1 in the display panel may be reduced. The first scan line 11 and the gate G are disposed in the non-opening area of the display panel. When the space occupied by the first scan line 11 and the gate G in the display panel is reduced, the space of the non-opening area occupied by the first scan line 11 and the gate G may be reduced, providing space for increase of aperture ratio. Accordingly, the overall aperture ratio of the display panel may be increased. In addition, when the aperture ratio is increased, more space in the display panel may be used for disposing the sub-pixels. Accordingly, the pixel density of the display panel may be increased.

Figure 17:
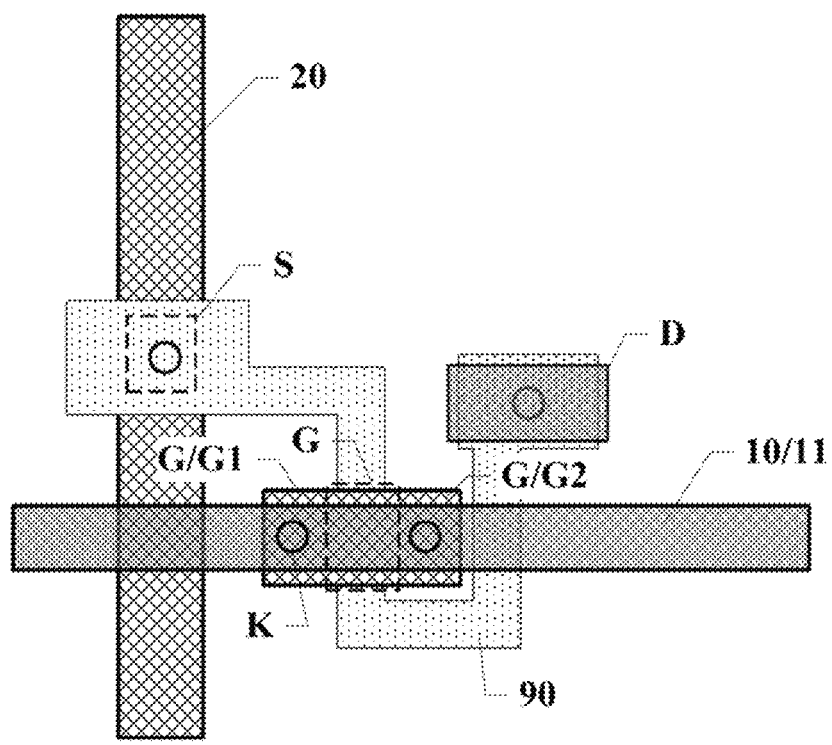
FIG. 17 illustrates another layout diagram corresponding to a single pixel circuit in FIG. 12, consistent with the disclosed embodiments of the present disclosure.

FIG. 16 shows the connection between the gate G and the first portion 111 of the first scan line 11 through one connection via K. In some other embodiments of the present disclosure, the gate G and the first portion 111 of the first scan line 11 may be connected through two connection vias K. FIG. 17 illustrates another layout diagram corresponding to a single pixel circuit in FIG. 12, consistent with the disclosed embodiments of the present disclosure. Referring to FIG. 17, in one embodiment, along the extending direction of the first scan line 11, the gate G includes two extension portions G1 and G2 extending from the body of the gate G to two sides. Along the thickness direction of the display panel, each extension portion overlaps with the first scan line 11. The two extension portions are electrically connected to the gate G of the first transistor T1 through a connection via K respectively. When the first scan line 11 is electrically connected to the gate G through two connection vias K, the first scan line 11 and the gate G are connected in parallel. As such, the overall impedance of the first scan line 11 may be decreased, and the attenuation of the driving signal transmitted on the first scan line 11 may be reduced. Accordingly, the driving uniformity to the sub-pixels at different positions connected to the first scan line 11 may be improved, and the display uniformity of the display panel may thus be improved.

Figure 18:
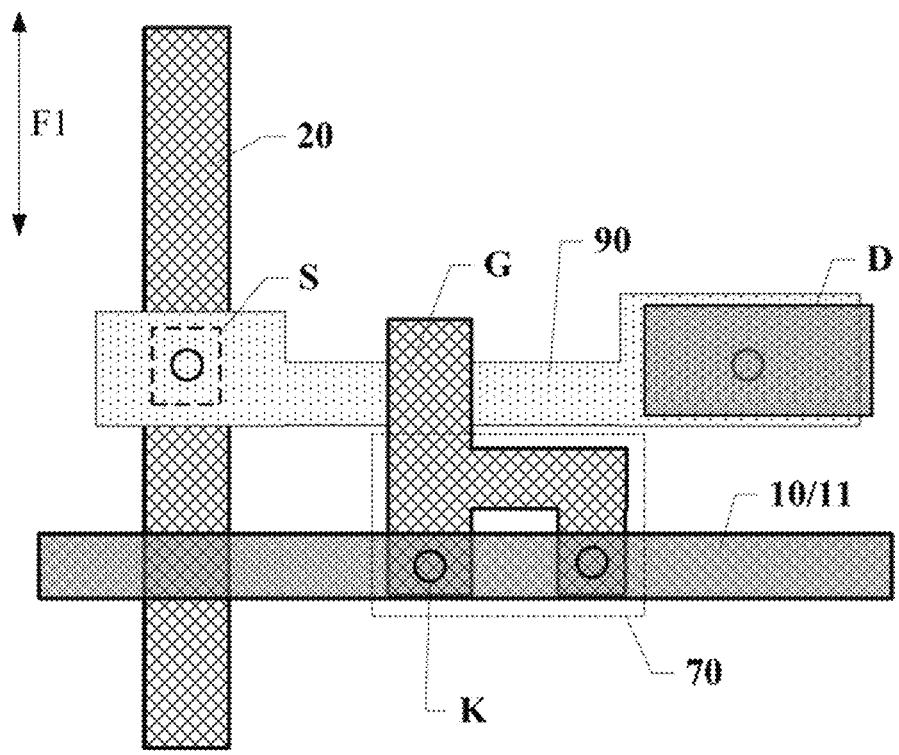
FIG. 18 illustrates another layout diagram corresponding to a single pixel circuit in FIG. 12, consistent with the disclosed embodiments of the present disclosure.

FIG. 18 illustrates another layout diagram corresponding to a single pixel circuit in FIG. 12, consistent with the disclosed embodiments of the present disclosure. Referring to FIG. 18, in one embodiment, a connection portion 70 electrically connected to the gate G is disposed on the film layer where the gate G is located. The connection portion 70 and the first scan line 11 are located on a same side of the gate G along a first direction F1. The first direction F1 is same as the extending direction of the data line 20. Along the thickness direction of the display panel, the connection portion 70 overlaps with the first scan line 11. The first scan line 11 is connected to the connection portion 70 through the connection via K.

Specifically, FIG. 18 shows another connection relationship between the gate G and the first scan line 11. In the film layer where the gate G is located, the gate G is electrically connected to the connection portion 70. The connection portion 70 and the first scan line 11 are located on a same side of the gate G along the first direction F1. The first direction F1 is the same as the extending direction of the data line 20. In one embodiment, the gate G and the connection portion 70 are disposed on a same layer, and may be manufactured in a same process. When the first scan line 11 is disposed on a side of the gate G along the first direction F1, along the thickness direction of the display panel, the connection portion 70 overlaps with the first scan line 11. The connection portion 70 is electrically connected to the first scan line 11 through the connecting via K. In one embodiment, since the first scan line 11 is disposed on a side of the gate G along the first direction F1, the wiring of the first scan line 11 may be simplified. Connection through the connection portion 70 may be suitable for products that do not require a very high pixel density.

Optionally, when the gate G is electrically connected to the first scan line 11 through the connection portions 70, the connection portions 70 corresponding to a same gate G may be electrically connected to the first scan line 11 through two connecting vias K respectively. As such, the first scan line 11 and the gate G may form a parallel relationship. Accordingly, the overall impedance of the first scan line 11 may be reduced, and the driving uniformity and display uniformity of the sub-pixels connected to the first scan line 11 may be improved.

Figure 19:
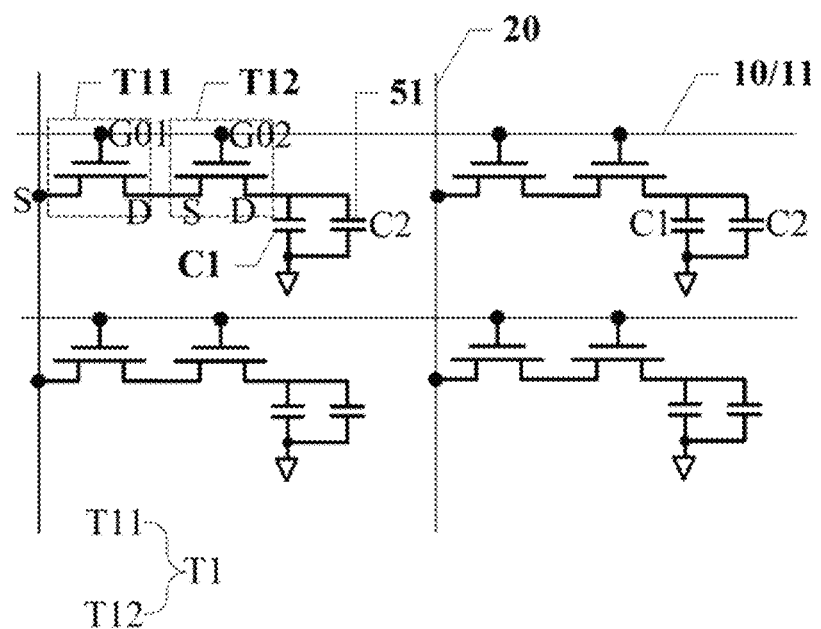
FIG. 19 illustrates another schematic circuit diagram of a pixel circuit in a display panel consistent with the disclosed embodiments of the present disclosure.
Figure 20:
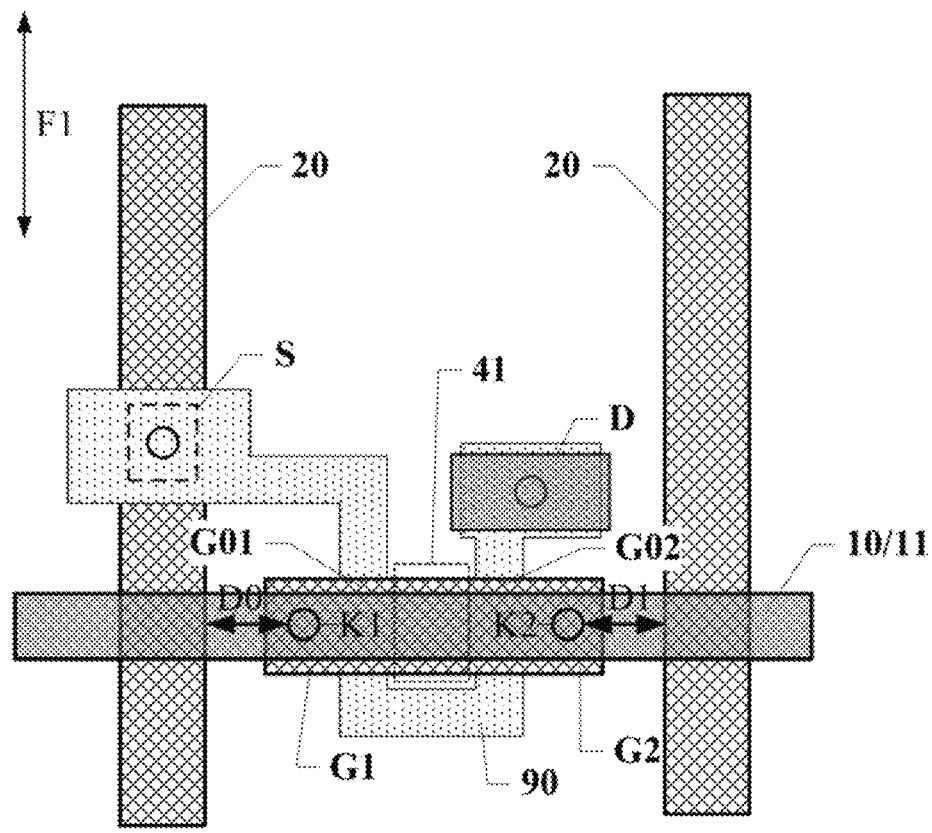
FIG. 20 illustrates a layout diagram corresponding to a single pixel circuit in FIG. 19, consistent with the disclosed embodiments of the present disclosure.

FIG. 19 illustrates another schematic circuit diagram of a pixel circuit in a display panel consistent with the disclosed embodiments of the present disclosure. FIG. 20 illustrates a layout diagram corresponding to a single pixel circuit in FIG. 19. In one embodiment, the first transistor T1 includes a first sub-transistor T11 and a second sub-transistor T12. Within one first transistor T1, a first gate G01 of the first sub-transistor T11 and a second gate G02 of the second sub-transistor T12 are electrically connected to a same first scan line 11. A first electrode S of the first sub-transistor T11 is electrically connected to the data line 20. A second electrode D of the first sub-transistor is electrically connected to a first electrode S of the second sub-transistor T12. A second electrode D of the second sub-transistor T12 is electrically connected to the pixel electrode 51.

Specifically, in one embodiment, the first transistor T1 includes two sub-transistors T11 and T12. The two sub-transistors each contain a gate, making the first transistor T1 a double-gate structure. Due to the double gate structure of the first transistor T1, the leakage phenomenon may be weakened, and the driving capability may be improved. In addition, since in the first transistor T1, the first gate G01 of the first sub-transistor T11 and the second gate G02 of the second sub-transistor T12 are each electrically connected to the first scan line 11, the first gate G01 and the second gate G02 are equivalently connected to the first scan line 11 in parallel. As such, the overall impedance of the first scan line 11 may be reduced, and the uniformity of the driving signal transmitted on the first scan line 11 may be improved. The overall display uniformity of the sub-pixels in the display panel may thus be improved.

Still referring to FIG. 20, in one embodiment, within one first transistor T1, the first gate G01 and the second gate G02 are electrically connected through a first connection portion 41. Along the arrangement direction of the first gate G01 and the second gate G02, the first connection portion 41 is located between the first gate G01 and the second gate G02. The first gate G01 includes a first extension portion G1 on a side of the first gate G01 away from the first connection portion 41. The second gate G02 includes a second extension portion G2 on a side of the second gate G02 away from the first connection portion 41. The first extension portion G1 is electrically connected to the first scan line 11 through a first connection via K1. The second extension portion G2 is electrically connected to the first scan line 11 through a second connection via K2.

In one embodiment, the first transistor T1 includes the first sub-transistor T11 and the second sub-transistor T12. The first gate G01 of the first sub-transistor T11 is connected to the second gate G02 of the second sub-transistor T12 through the first connection portion 41. The first gate G01 extends away from the first connection portion 41, forming the first extension portion G1. The second gate G02 extends away from the first connection portion 41, forming the second extension portion G2. An overall extending direction of the first extension portion G1, the first gate G01, the first connection portion 41, the second gate G02, and the second extension portion G2 is same as the extending direction of the first scan line 11. In this way, the space of the non-display area occupied by the first gate G01, the second gate G02 and the first scan line 11 in the display panel may be reduced. As such, the aperture ratio of the display panel may be improved. In addition, when the aperture ratio increases, more space in the display panel may be used for disposing the sub-pixels. Accordingly, the pixel density of the display panel may be increased.

Optionally, along the thickness direction of the display panel, the first extension portion G1 and the second extension portion G2 each overlap with the first scan line 11. The first extension portion G1 is electrically connected to the first scan line 11 through the first connection via K1. The second extension portion G2 is electrically connected to the first scan line 11 through the second connection via K2. As such, the connection reliability between the gate G and the first scan line 11 may be improved. Further, the first gate G01 and the second gate G02 are equivalently connected to the first scan line 11 in parallel. Accordingly, the overall impedance of the first scan line 11 may be decreased, and the attenuation of the driving signal transmitted by the first scan line 11 may be reduced, and the display uniformity of the sub-pixels connected to the first scan line 11 may thus be improved.

Still referring to FIG. 20, in one embodiment, a minimum distance between the first connection via K1 and the data line 20 connected to the first sub-transistor T11 is D0, with D0≥1.5 μm. A minimum distance between the second connection via K2 and the adjacent data line 20 is D1, with D1≥1.5 μm.

Specifically, in one embodiment, to improve the metal conductivity of the first scan line 11, the first scan line 11 may be disposed on a film layer with higher metal conductivity. To avoid changes in characteristics of the first transistor T1, the gate G of the first transistor T1 may be disposed on a film layer with a lower metal conductivity. In a display panel, the metal layer where the data line 20 is originally located may have a higher metal conductivity, and the metal layer where the scan line 10 is originally located may have a lower metal conductivity. In actual production, the film layer where the first scan line 11 is located may be interchanged with the film layer where the data line 20 is located. The first scan line 11 may be disposed on the film layer with higher metal conductivity, and the data line 20 may be disposed on the film layer with lower metal conductivity. In this way, the data line 20 may be disposed on a same layer as the gate G of the first transistor T1.

When the first gate G01 and the second gate G02 respectively extend in a direction away from the first connection portion 41, the first extension portion G1 and the second extension portion G2 may be close to the data line 20. When the distance D0 between the first extension portion G1 and the adjacent data line 20 is less than approximately 1.5 μm, or the distance D1 between the second extension portion G2 and the adjacent data line 20 is less than approximately 1.5 μm, the distance between the extension portion and the data line 20 may be close to the error range of the manufacturing process. As such, a short circuit between the gate G and the data line 20 may occur. Accordingly, in the present disclosure, to avoid the short circuit between the gate G and the data line 20, D0 and D1 are respectively set to be greater than or equal to approximately 1.5 µm. In addition, on the premise that D0 and D1 are respectively set to be greater than or equal to approximately 1.5 µm, for the improvement of the aperture ratio and the improvement of the pixel density, D0 and D1 may be set to be small, for example, to be equal to approximately 1.5 µm, or less than or equal to approximately 3 µm.

Optionally, D0 and D1 may set to be approximately in ranges given by 2 µm≤D0≤3 µm, 2 µm≤D1≤3 µm. Such a configuration may avoid the short circuit between the gate and the data line due to close distance. Such a configuration may also avoid an issue that, due to the large distance between the gate and the data line (for example, greater than approximately 3 µm), the area of a single sub-pixel may be large, thus affecting the pixel density of the display panel. Accordingly, the pixel density of the display panel may be improved.

Figure 21:
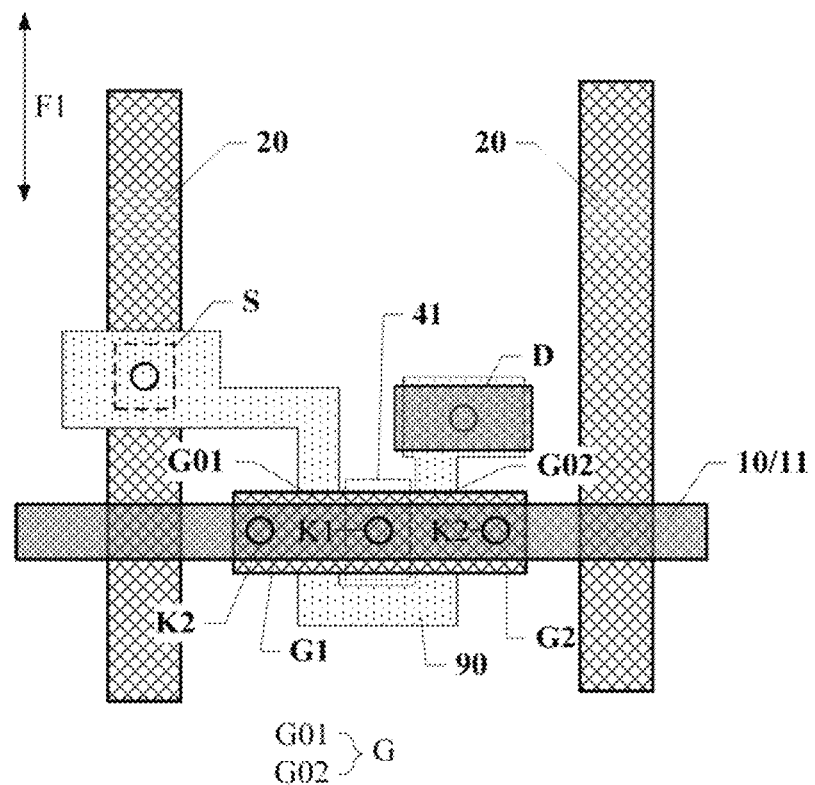
FIG. 21 illustrates another layout diagram corresponding to a single pixel circuit in FIG. 19, consistent with the disclosed embodiments of the present disclosure.

FIG. 21 illustrates another layout diagram corresponding to a single pixel circuit in FIG. 19, consistent with the disclosed embodiments of the present disclosure. In one embodiment, within one first transistor T1, the first gate G01 and the second gate G02 are electrically connected through a first connection portion 41. Along the arrangement direction of the first gate G01 and the second gate G02, the first connection portion 41 is located between the first gate G01 and the second gate G02. The first gate G01 includes a first extension portion G1 on a side of the first gate G01 away from the first connection portion 41. The second gate G02 includes a second extension portion G2 on a side of the second gate G02 away from the first connection portion 41. The first connection portion 41 is electrically connected to the first scan line 11 through a first connection via K1. At least one of the first extension portion G1 and the second extension portion G2 is electrically connected to the first scan line 11 through a second connection via K2.

Specifically, in one embodiment, the first gate G01 and the second gate G02 are electrically connected through the first connection portion 41. The first connection portion 41 is electrically connected to the first scan line 11 through the first via K1. The first extension portion G1 is electrically connected to the first scan line 11 through one second via K2. The second extension portion G2 is electrically connected to the first scan line 11 through another second via K2. When the first scan line 11 is electrically connected to the gate G through three vias, two resistors are equivalently connected in parallel to the first scan line 11. Accordingly, the impedance of the first scan line 11 may be reduced, and the signal transmission efficiency on the first scan line 11 may be improved.

Figure 22:
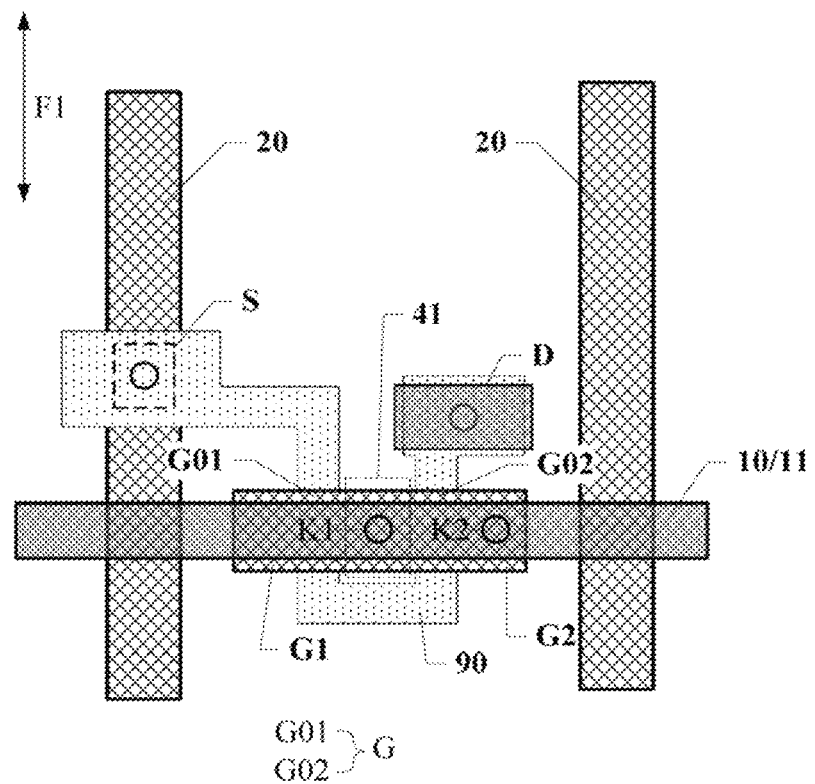
FIG. 22 illustrates another layout diagram corresponding to a single pixel circuit in FIG. 19, consistent with the disclosed embodiments of the present disclosure.

In some other embodiments of the present disclosure, when the sub-pixel space is limited, the first scanning line 11 and the gate G may also be connected in parallel only through two vias. FIG. 22 illustrates another layout diagram corresponding to a single pixel circuit in FIG. 19, consistent with the disclosed embodiments of the present disclosure. Referring to FIG. 22, in one embodiment, the first connection portion 41 is electrically connected to the first scan line 11 through the first via K1. The second extension portion G2 is electrically connected to the first scan line 11 through the second via K2. Accordingly, the parallel connection between the gate G and the first scan line 11 may be realized, and the impedance of the first scan line may be reduced. It should be noted that the present disclosure does not limit the position of the second via K2. In some other embodiments of the present disclosure, the second via K2 may also be used to connect the first extension portion G1 and the first scan line 11.

Figure 23:
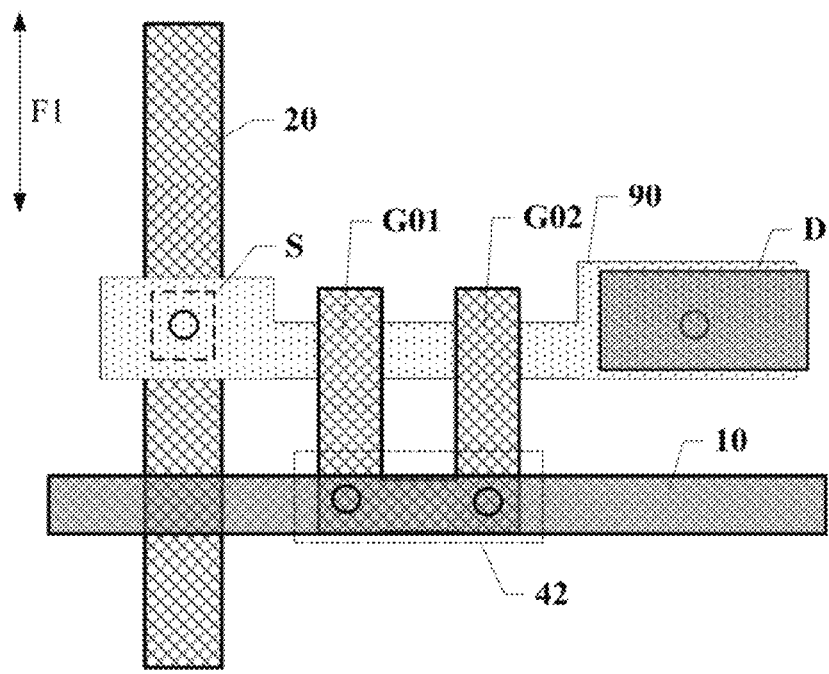
FIG. 23 illustrates another layout diagram corresponding to a single pixel circuit in FIG. 19, consistent with the disclosed embodiments of the present disclosure.

FIG. 23 illustrates another layout diagram corresponding to a single pixel circuit in FIG. 19, consistent with the disclosed embodiments of the present disclosure. Referring to FIGS. 19 and 23, in one embodiment, within one first transistor T1, the first gate G01 and the second gate G02 are electrically connected through a second connection portion 42. The second connection portion 42 is located on a same side of the first gate G01 and the second gate G02 along the first direction F1. The first direction F1 intersects the arrangement direction of the first gate G01 and the second gate G02, and is same as the extending direction of the data line 20. The second connection portion 42 is electrically connected to the first scan line 11 through two or more connection vias.

Specifically, in one embodiment, the scan line 10 is disposed on a same side of the first gate G01 and the second gate G02 along the first direction F1. The first gate G01 and the second gate G02 are electrically connected through the second connection portion 42. The second connection portion 42 and the first scan line 11 are located on a same side of the first gate G01 and the second gate G02. The first gate G01 and the second gate G02 extend along the first direction F1 and are electrically connected to the second connection portion 42. Along the thickness direction of the display panel, the second connection portion 42 overlaps the first scan line 11. The second connection portion 42 is electrically connected to the first scan line 11 through two or more connection vias. In this way, the first scan line 11 and the gate G of the first transistor T1 are equivalently connected in parallel. Accordingly, the overall impedance of the first scan line 11 may be reduced, the uniformity of the driving signal transmitted on the first scan line 11 may be improved, and the overall display uniformity of the display panel may be improved.

Still referring to FIG. 23, in one embodiment, along the thickness direction of the display panel, the first scan line 11 does not overlap with the active layer 90 of the first transistor T1.

In one embodiment, the first scan line 11 is located on a first side of the first gate G01 and the second gate G02 along the first direction F1. Along the thickness direction of the display panel, the first scan line 11 does not overlap with the active layer 90. With this configuration, wiring of the first scan line 11 may be simplified, and difficulty of manufacturing the display panel may be reduced. This configuration may be suitable for displaying products that do not require a high pixel density.

Figure 24:
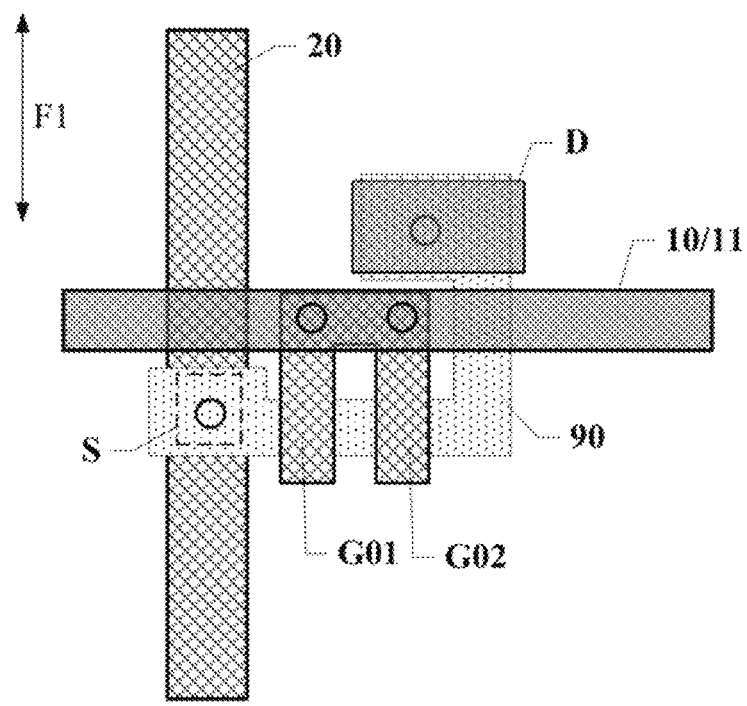
FIG. 24 illustrates another layout diagram corresponding to a single pixel circuit in FIG. 19, consistent with the disclosed embodiments of the present disclosure.

FIG. 24 illustrates another layout diagram corresponding to a single pixel circuit in FIG. 19, consistent with the disclosed embodiments of the present disclosure. Referring to FIG. 24, in one embodiment, along the first direction F1, the first scan line 11 is located between the first electrode S and the second electrode D in the first transistor T1. The first electrode S is connected to the data line 20, and the second electrode D is connected to the pixel electrode. The first direction F1 is same as the extending direction of the data line 20.

Specifically, FIGS. 19 and 24 show another relative positional relationship between the first scan line 11 and the first transistor T1. The first transistor T1 includes a first electrode S and a second electrode D. The first electrode S is connected to the data line 20, and the second electrode D is connected to the pixel electrode. Along the arrangement direction of the first gate G01 and the second gate G02, the first electrode S is located on a side of the first gate G01 away from the second gate G02. Along the first direction F1, the second electrode D is located on a side of the first gate G01 and the second gate G02 facing the pixel electrode connected to the second electrode D. The active layer 90 has an L-shaped structure. In one embodiment, along the first direction F1, the first scan line 11 is disposed between the second electrode D and the first electrode S of the first transistor T1. As such, the space occupied by the first scan line 11 and the first transistor in the display panel may be reduced, and the space occupied by a single sub-pixel in the display panel may be reduced. Accordingly, the aperture ratio of the display panel may be improved, and the pixel density may be increased. This configuration may be suitable for display products that require a high pixel density.

In one embodiment, the active layer 90 of the first transistor T1 may be U-shaped, I-shaped or L-shaped. Specifically, the active layer 90 of the first transistor T1 shown in FIG. 20 is U-shaped, the active layer 90 of the first transistor T1 shown in FIG. 23 is I-typed, and the active layer 90 of the first transistor T1 shown in FIG. 24 is L-shaped. When the active layer 90 is U-shaped or L-shaped, along the thickness direction of the display panel, the first scan line 11 may be set to overlap with the active layer 90 and not overlap with the first electrode S and the second electrode D of the first transistor T1. As such, the space actually occupied by the first scan line 11 and the corresponding first transistor T1 in the display panel may be reduced, and more areas in the display panel may be used for disposing the sub-pixels. Accordingly, the pixel density of the display panel may be increased. The active layer 90 with a U-shaped or L-shaped structure may be suitable for display products that require a high pixel density.

When the active layer 90 of the first transistor T1 is I-typed, the manufacturing process difficulty of the active layer 90 may be simplified. In this case, the first scan line 11 may be disposed on one side of the active layer 90 along the first direction F1. The active layer 90 does not overlap with the first scan line 11 along the thickness direction of the display panel, such that the wiring difficulty of the first scan line 11 may be simplified. The active layer 90 with an I-type structure may be suitable for display products that do not require a high pixel density.

Figure 25:
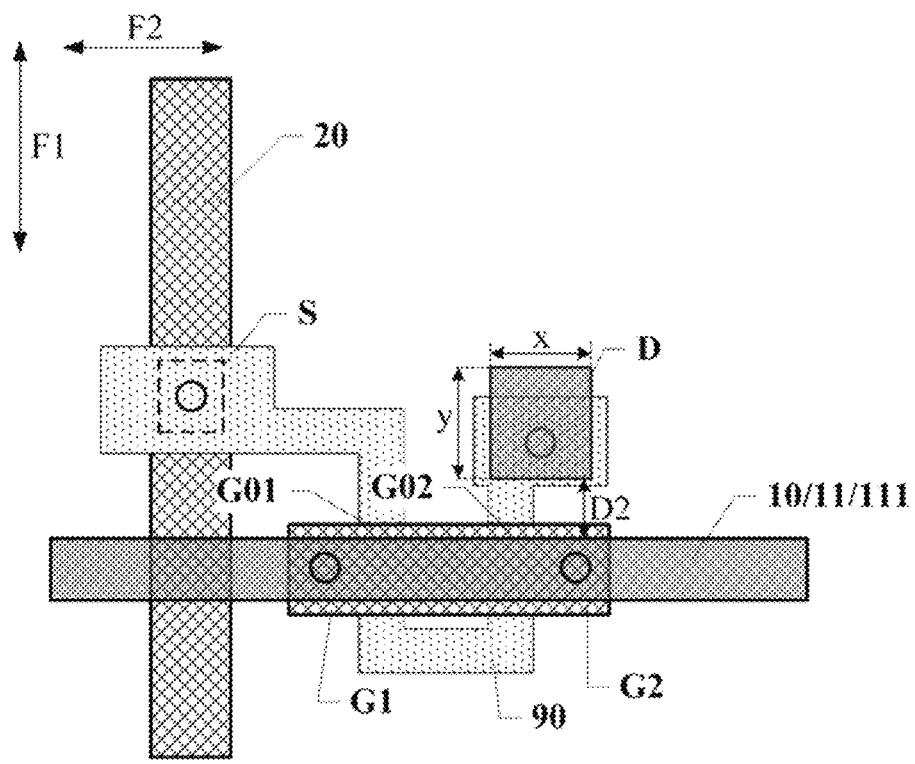
FIG. 25 illustrates another layout diagram corresponding to a single pixel circuit in FIG. 19, consistent with the disclosed embodiments of the present disclosure.

FIG. 25 illustrates another layout diagram corresponding to a single pixel circuit in FIG. 19, consistent with the disclosed embodiments of the present disclosure. In one embodiment, the first portion 111 of the first scan line 11 is on a same layer as the second electrode D of the first transistor T1. Along the arrangement direction of the first portion 111 and the second electrode D, a distance between the first portion 111 and the second electrode D is D2, with D2≥1.5 μm.

Referring to FIG. 25, in one embodiment, the film layer where the first electrode S and the second electrode D of the first transistor T1 are located is a film layer with a higher metal conductivity. The first portion 111 of the first scan line 11 may be disposed on a same layer as the first electrode S and the second electrode D of the first transistor T1. In this configuration, to avoid the short circuit between the first portion 111 and the second electrode D due to the small distance (for example, less than 1.5 μm) between the first portion 111 of the first scan line 11 and the second electrode D, in the present disclosure, the distance between the first portion 111 and the second electrode D may be set to be greater than or equal to 1.5 μm. Even if there are deviations in the manufacturing process, the short circuit between the first portion 111 and the second electrode D may be avoided. Accordingly, the stability of the pixel circuit may be improved.

Optionally, D2 may be in a range approximately given by 2 μm≤D2≤3 μm. With this configuration, the short circuit between the first scan line and the second electrode of the first transistor due to close distance may be avoided. In addition, the distance between the first scan line and the second electrode of the first transistor may not be too large (for example, greater than 3 μm). As such, the area of a single sub-pixel may not be too large, and the pixel density of the display panel may not be affected. Accordingly, the pixel density of the display panel may also be increased.

Still referring to FIG. 25, in one embodiment, when D2≤3 μm, a length x of the second electrode D along the second direction F2 is smaller than a length y of the second electrode D along the first direction F1. The first direction F1 is the extending direction of the data lines 20, and the second direction F2 is the extending direction of the scan lines 10.

Specifically, in one embodiment, the first portion 111 of the first scan line 11 and the second electrode D of the first transistor T1 is are disposed on a same layer. When the first portion 111 is disposed opposite to the second electrode D, parallel capacitance may be generated between the first portion 111 and the second electrode D. When the facing area of the first portion 111 and the second electrode D are consistent, the smaller the distance D2 between the first portion 111 and the second electrode D is, the larger the parallel capacitance may be, and the greater the impact on the accuracy of the signal may be. Accordingly, when D2≤3 μm, the length x of the second electrode D along the second direction F2 may be set to be small, specifically x<y. In this way, the facing area of the second electrode D and the first scan line 11 may be reduced, and the parallel capacitance between the second electrode D and the first scan line 11 may thus be reduced. Accordingly, the influence of parallel capacitance on display may be reduced.

Figure 26:
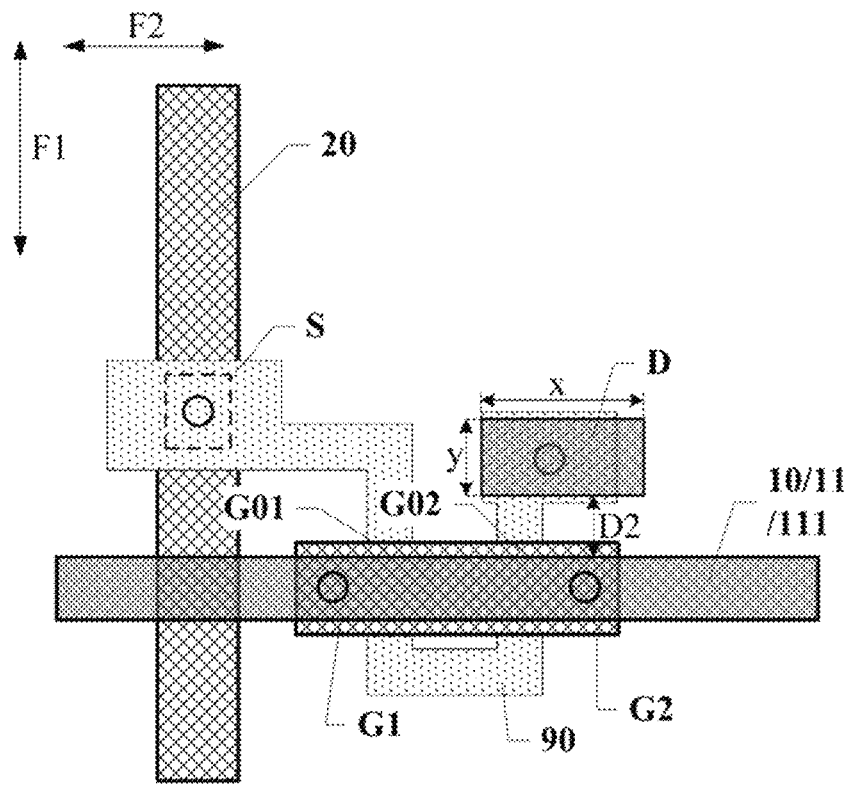
FIG. 26 illustrates another layout diagram corresponding to a single pixel circuit in FIG. 19, consistent with the disclosed embodiments of the present disclosure.

FIG. 26 illustrates another layout diagram corresponding to a single pixel circuit in FIG. 19, consistent with the disclosed embodiments of the present disclosure. In one embodiment, when D2>3 μm, the length x of the second electrode D along the second direction F2 is greater than the length y of the second electrode D along the first direction F1. The first direction F1 is the extending direction of the data lines 20, and the second direction F2 is the extending direction of the scan lines 10.

Specifically, when the distance D2 between the first scan line 11 and the second electrode D is large, for example, D2>3 μm, the parallel capacitance between the first scan line 11 and the second electrode D may be small, and may hardly affect the display effect. On this basis, to increase the overlapping area of the second electrode D and the active layer 90, the length x of the second electrode D along the second direction F2 may be increased such that x>y. Accordingly, the connection reliability between the second electrode D and the active layer 90 may be improved.

Figure 27:
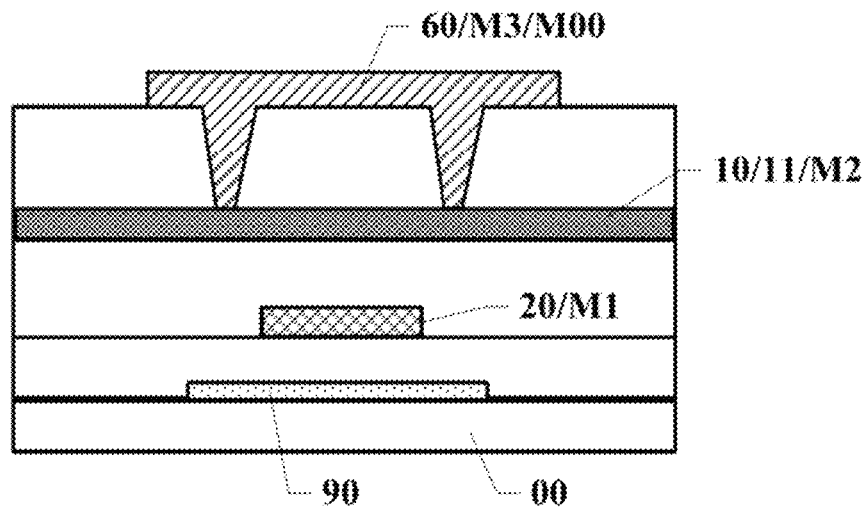
FIG. 27 illustrates a schematic connection diagram of a first scan line and an auxiliary metal part in a display panel consistent with the disclosed embodiments of the present disclosure.

FIG. 27 illustrates a schematic connection diagram of a first scan line and an auxiliary metal part in a display panel consistent with the disclosed embodiments of the present disclosure. In one embodiment, the display panel also includes an auxiliary metal layer M00. The auxiliary metal layer M00 includes a plurality of auxiliary metal parts 60 disposed corresponding to the first scan line 11. One auxiliary metal part 60 is connected to the first scan line 11 through at least two vias.

Specifically, in one embodiment, the first scan line 11 is electrically connected to the auxiliary metal part 60. Moreover, one auxiliary metal part 60 is connected to the first scan line 11 through two vias. In this configuration, the first scan line 11 is equivalently connected with an impedance in parallel. As such, the overall impedance of the first scan line 11 may be reduced, and the uniformity of the driving signal transmitted through the first scan line 11 may be improved. Accordingly, the display uniformity of the sub-pixels in the display panel may be improved.

In one embodiment, the metal conductivity of the auxiliary metal part 60 is greater than or equal to the metal conductivity of the first scan line 11. The auxiliary metal part 60 is connected in parallel with the first scan line 11. When the metal conductivity of the auxiliary metal part 60 is equal to the metal conductivity of the first scan line 11, the first scan line 11 is equivalently connected in parallel with a small impedance. As such, the overall impedance of the first scan line 11 may be reduced. When the metal conductivity of the auxiliary metal part 60 is greater than the metal conductivity of the first scan line 11, the impedance of the auxiliary metal part 60 may be smaller. When the auxiliary metal part 60 with lower impedance is connected in parallel to the first scan line 11, the reduction of the overall impedance of the first scan line 11 may be greater.

Still referring to FIG. 27, in one embodiment, the display panel includes a substrate 00, a first metal layer M1, a second metal layer M2, and a third metal layer M3. The first metal layer M1, the second metal layer M2, and the third metal layer M3 are disposed on one side of the substrate 00. Each metal layer is separated by an insulating layer. Along a direction perpendicular to a plane where the substrate is located, the first metal layer M1 is located between the substrate 00 and the second metal layer M2, and the third metal layer M3 is located on a side of the second metal layer M2 away from the substrate. The auxiliary metal layer M00 may multiplex the third metal layer M3.

Specifically, when the auxiliary metal layer M00 is introduced into the display panel, the auxiliary metal layer M00 may be disposed on the third metal layer M3 in the display panel. When the display panel includes a touch function, the third metal layer M3 may be used for arranging touch lines connected to touch electrodes. When the auxiliary metal layer M00 is disposed on the third metal layer M3, no additional film layer is needed in the display panel, and the existing film layer may be multiplexed. The auxiliary metal part 60 in the auxiliary metal layer M00 may be fabricated in a same process as the touch wiring simultaneously. Accordingly, while the overall impedance of the first scan line 11 may be reduced by introducing the auxiliary metal layer M00, the manufacturing process of the display panel may be simplified, and the production efficiency of the display panel may be improved.

Figure 28:
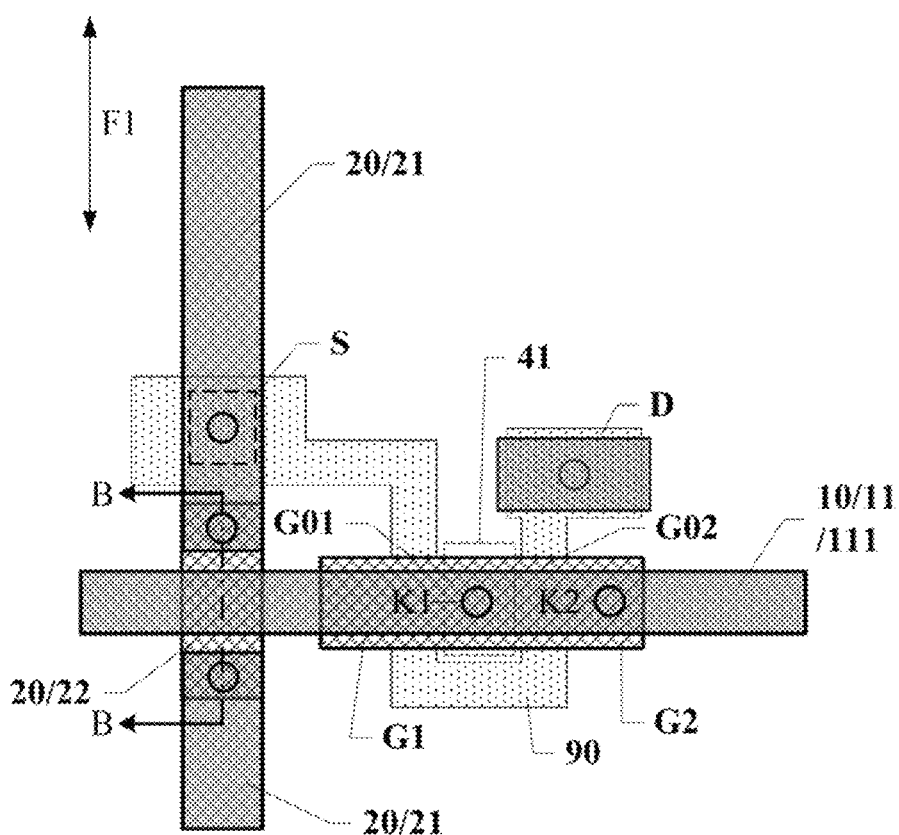
FIG. 28 illustrates another layout diagram corresponding to a single pixel circuit in FIG. 19, consistent with the disclosed embodiments of the present disclosure.
Figure 29:
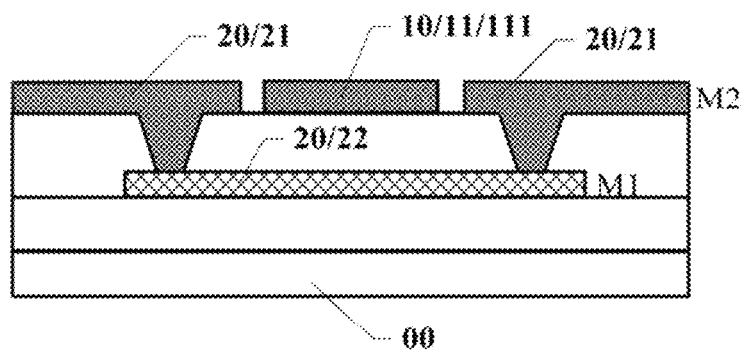
FIG. 29 illustrates a cross-sectional diagram along BB in FIG. 28, consistent with the disclosed embodiments of the present disclosure.
Figure 30:
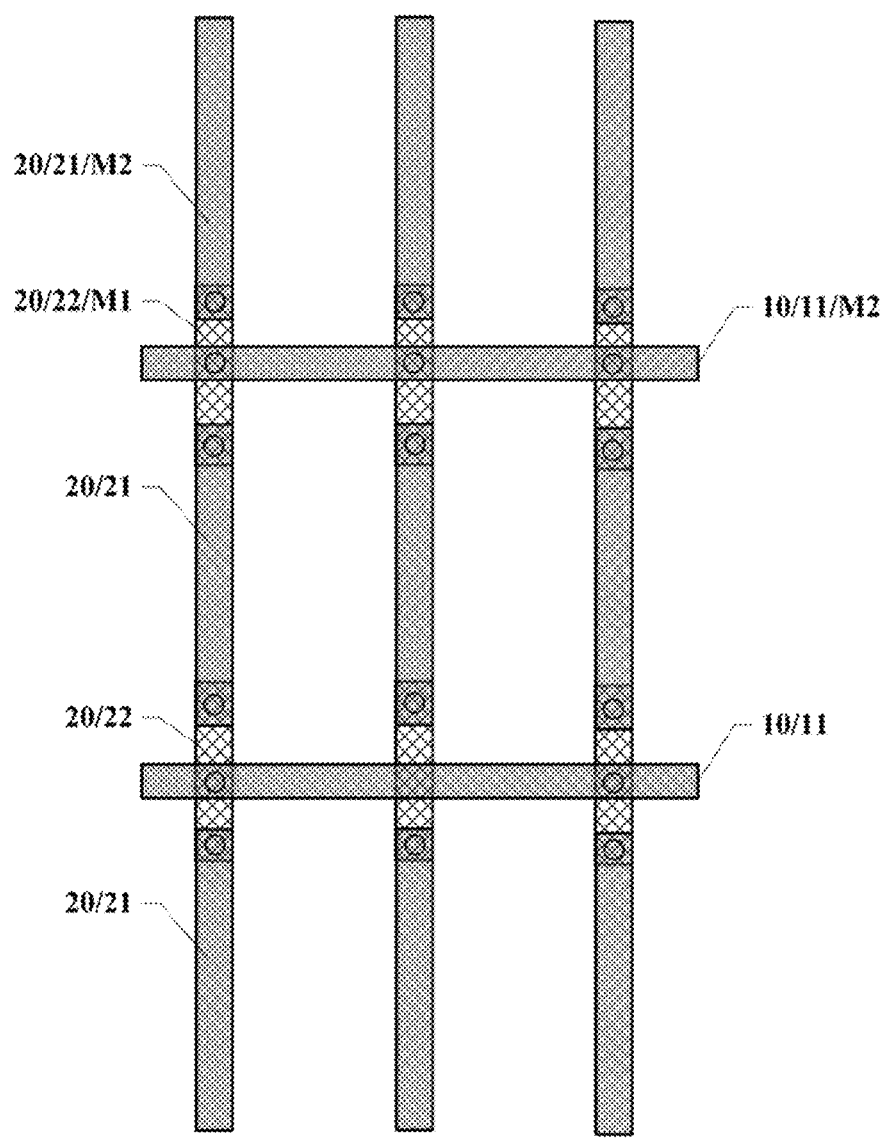
FIG. 30 illustrates a top structural view of a first scan line and a data line consistent with the disclosed embodiments of the present disclosure.

FIG. 28 illustrates another layout diagram corresponding to a single pixel circuit in FIG. 19, consistent with the disclosed embodiments of the present disclosure. FIG. 29 illustrates a cross-sectional diagram along BB in FIG. 28. FIG. 30 illustrates a top structural view of a first scan line and a data line. Referring to FIGS. 28-30, in one embodiment, the display panel includes a substrate 00, a first metal layer M1, and a second metal layer M2. The first metal layer M1 and the second metal layer M2 are disposed on one side of the substrate 00. Along a direction perpendicular to the plane where the substrate 00 is located, the first metal layer M1 is located between the substrate 00 and the second metal layer M2. The metal conductivity of the second metal layer M2 is greater than the metal conductivity of the first metal layer M1. The first portion 111 is disposed in the second metal layer M2.

Specifically, in one embodiment, the display panel includes a first metal layer M1 and a second metal layer M2. The first metal layer M1 has lower metal conductivity, and the second metal layer M2 has higher metal conductivity. In this configuration, when the first portion 111 of the first scan line 11 is arranged on the second metal layer M2 with higher metal conductivity, the metal conductivity of the first portion 111 may be improved, and the overall metal conductivity of the first scan line 11 may be improved. In one embodiment, the entire first scan line 11 is disposed on the second metal layer M2 with higher metal conductivity, and the overall metal conductivity of the first scan line 11 may be improved. In some other embodiments, according to actual requirements, each of the first scan lines 11 in the display panel may be disposed on the second metal layer M2 with higher metal conductivity.

Still referring to FIG. 28-30, in one embodiment, one data line 20 includes a plurality of first subsections 21 and a second subsection 22 connecting two adjacent first subsections 21. The first subsection 21 is located in the second metal layer M2, and the second subsection 22 is located in the first metal layer M1. Along the direction perpendicular to the plane where the substrate 00 is located, the second subsection 22 overlaps with the first scan line 11, and the first subsection 21 does not overlap with the first scan line 11. The first subsection 21 and the second subsection 22 are electrically connected through connection vias.

Specifically, when the first scan line 11 is disposed on the second metal layer M2 with higher metal conductivity to increase the overall metal conductivity of the first scan line 11, at least part of line segments in the data line 20 may be disposed on the second metal layer M2 with higher metal conductivity. In one embodiment, the first subsection 21 of the data line 20 is disposed on the second metal layer M2. Along the direction perpendicular to the plane of the substrate 00, the first subsection 21 of the data line 20 does not overlap with the first scan line 11. Accordingly, though the first scan line 11 and the first subsection 21 each are disposed on the second metal layer M2, the short circuit between the first scan line 11 and the first subsection 21 of the data line 20 may be avoided.

In one embodiment, the second subsection 22 of the data line 20 is disposed on the first metal layer M1. The second subsection 22 is configured to electrically connect two adjacent first subsections 21 of the data line 20, such that the normal signal transmission function of the data line may be realized. Since the first subsection 21 of the data line 20 is disposed on the second metal layer M2 with higher metal conductivity, after the first subsection 21 and the second subsection 22 are connected, the overall metal conductivity of the data line 20 may be improved, and the overall impedance of the data line 20 may be reduced. As such, the voltage drop in the data line 20 during the signal transmission process may be reduced. Accordingly, while keeping the driving capability of the first scan line, the signal transmission efficiency of the data line may be improved.

In one embodiment, within one data line 20, a length of the first subsection 21 is greater than a length of the second subsection 22. Still referring to FIG. 30, the lengths of the first subsection 21 and the second subsection 22 in the data line 20 refer to lengths of the first subsection 21 and the second subsection 22 in the extending direction of the data line 20. Within one data line 20, the length of the first subsection 21 being greater than the length of the second subsection 22, means that, in the data line 20, the length of the first subsection 21 located between two adjacent second subsections 22 is greater than the length of the second subsection 22. Alternatively, within a same data line 20, the length of the first subsection 21 being greater than the length of the second subsection 22, may also mean that, in the data line 20, the total length of the plurality of first subsections 21 is greater than the total length of the plurality of second subsections 22.

In one embodiment, the first subsection 21 is disposed on the second metal layer M2 with higher metal conductivity. The length of the first subsection 21 is greater than the length of the second subsection 22. That is, most of the line segments in the data line 20 are disposed on the second metal layer M2 with higher metal conductivity. Accordingly, the overall metal conductivity of the data line 20 may be increased, the overall impedance of the data line 20 may be reduced, and the signal transmission efficiency on the data line 20 may be improved.

Figure 31:
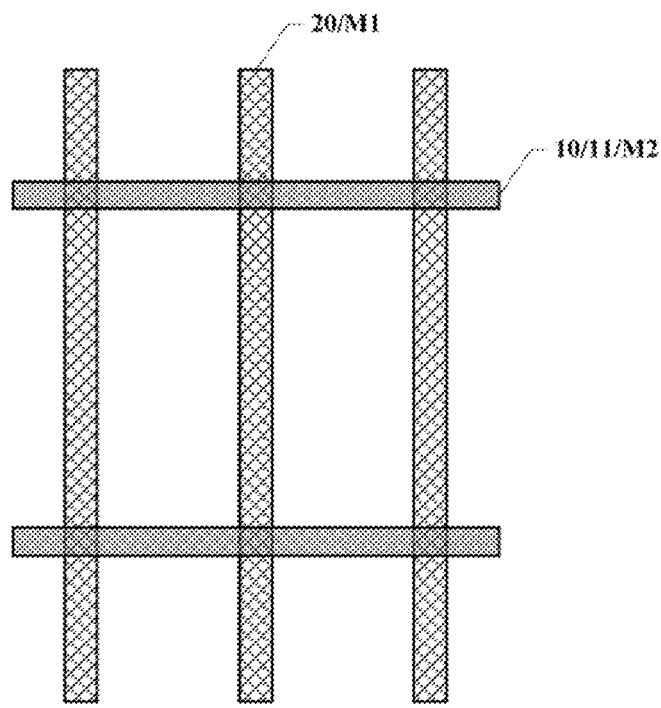
FIG. 31 illustrates another top structural view of a first scan line and a data line consistent with the disclosed embodiments of the present disclosure.

FIG. 31 illustrates another top structural view of a first scan line and a data line consistent with the disclosed embodiments of the present disclosure. In one embodiment, the data line 20 is disposed on the first metal layer M1. Specifically, the display panel includes the first metal layer M1 and the second metal layer M2. The entire data line 20 is disposed on the first metal layer M1. Production of the data line 20 may be completed in one manufacturing process, and no via connections are required. Accordingly, the manufacturing process of the data line 20 may be simplified, the overall manufacturing process of the display panel may be simplified, and the production efficiency of the display panel may be improved.

Figure 32:
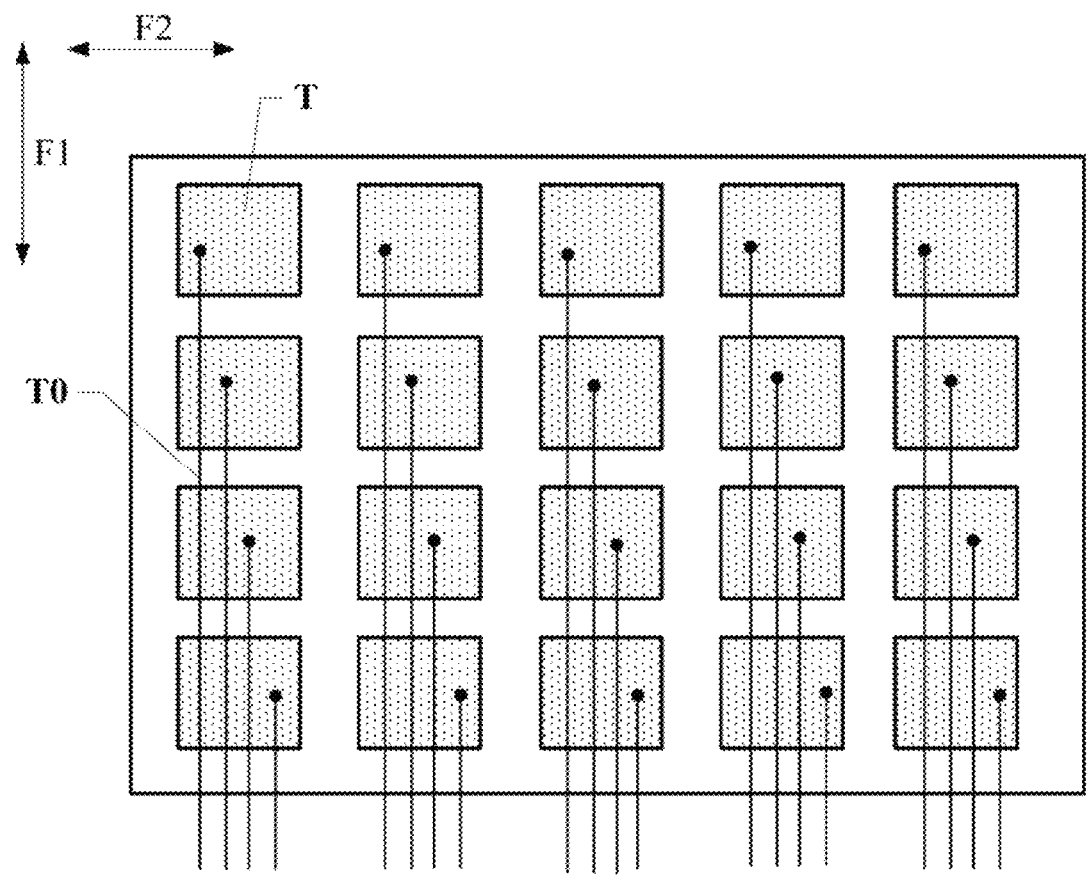
FIG. 32 illustrates a schematic connection diagram of a touch electrode and a touch line in a display panel consistent with the disclosed embodiments of the present disclosure.
Figure 33:
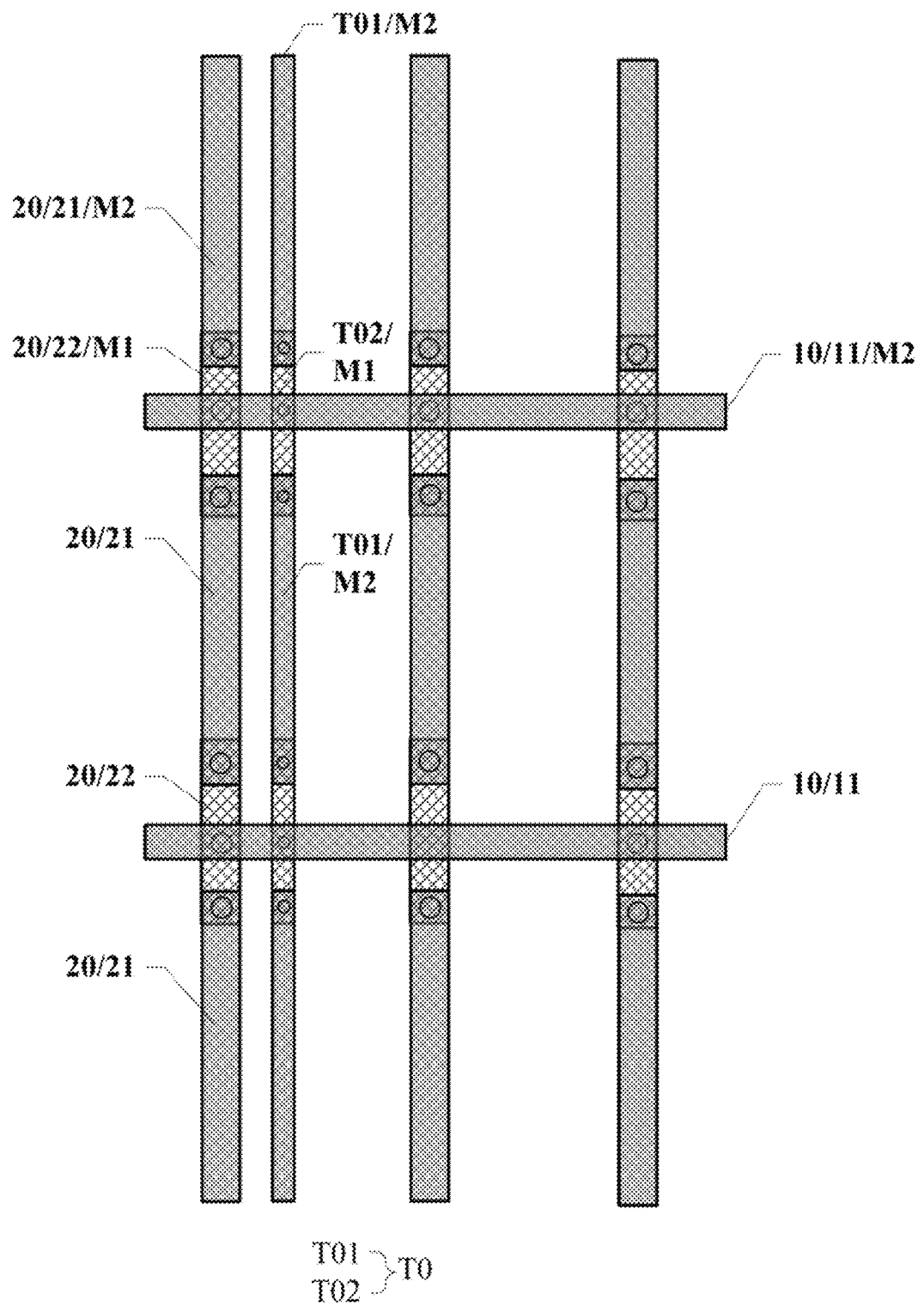
FIG. 33 illustrates a schematic layout diagram of a data line and a touch line in a display panel consistent with the disclosed embodiments of the present disclosure.
Figure 34:
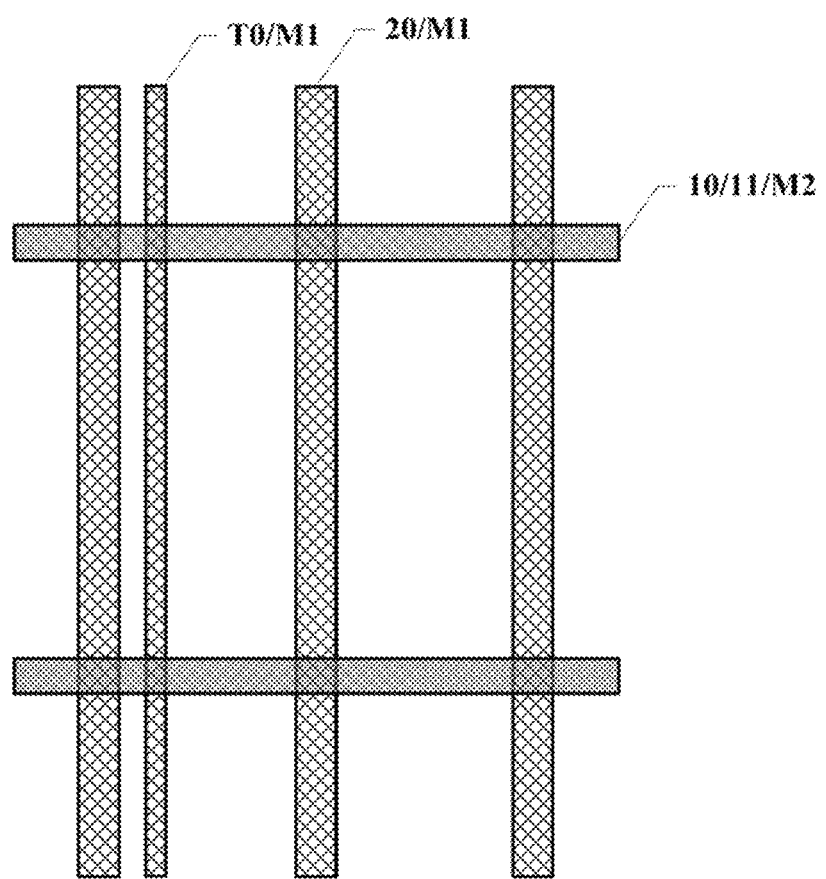
FIG. 34 illustrates another schematic layout diagram of a data line and a touch line in a display panel consistent with the disclosed embodiments of the present disclosure.

FIG. 32 illustrates a schematic connection diagram of a touch electrode and a touch line in a display panel consistent with the disclosed embodiments of the present disclosure. FIG. 33 illustrates a schematic layout diagram of a data line and a touch line in a display panel. FIG. 34 illustrates another schematic layout diagram of a data line and a touch line in a display panel.

Referring to FIGS. 32-34 in conjunction with FIG. 29, in one embodiment, the display panel also includes a touch electrode T and a touch line T0 electrically connected to the touch electrode T. The touch electrode T is disposed on a side of the second metal layer M2 away from the substrate 00. At least a part of line segments in the touch line T0 is located on the second metal layer M2. Alternatively, the touch line T0 is located on the first metal layer M1.

FIG. 32 only uses an example that the touch electrodes in the display panel are self-capacitive touch electrodes, to illustrate the touch electrodes, but does not limit types of touch electrodes. In some other embodiments of the present disclosure, the touch electrodes may also be mutual-capacitive touch electrodes. The touch electrodes T may transmit touch signals through the touch lines T0.

Referring to FIGS. 32 and 33, when the touch line T0 is introduced into the display panel, the touch line T0 may be wired in a same wiring method as the data line 20. Optionally, the touch line T0 includes a first sub-trace T01 and a second sub-trace T02 connecting two adjacent first sub-traces T01. The first sub-trace T01 is disposed on the second metal layer M2, and the second sub-trace T02 is disposed on the first metal layer M1. The first sub-trace T01 and the second sub-trace T02 are electrically connected through a via. In this configuration, the first sub-trace T01 in the touch line T0 and the first subsection 21 in the data line 20 are each disposed on the second metal layer, and may be manufactured in a same production process. The second sub-trace T02 in the touch line T0 and the second subsection 22 in the data line 20 are each disposed on the first metal layer M1, and may be manufactured in a same production process. As such, no additional film layers are needed for the introduction of the touch lines, and the existing first metal layer M1 and the second metal layer M2 may be multiplexed. Accordingly, the manufacturing process of the display panel may be simplified, and the film-layer structure of the display panel may be simplified. In addition, when the first sub-trace T01 in the touch line T0 is disposed on the second metal layer M2, the metal conductivity of the touch line T0 may be improved, and the overall impedance of the touch line T0 may be reduced. Accordingly, efficiency and accuracy of the touch signal transmitted by the touch line T0 may be improved.

Referring to FIGS. 32 and 34, when the data line 20 is entirely disposed on the first metal layer M1, the touch line T0 may also be entirely disposed on the first metal layer M1. That is, the data line 20 and the touch line T0 may be disposed on a same layer. In this way, the fabrication of the touch line T0 may be completed while fabricating the data line 20. A same mask may be used to make the data line 20 and the touch line T0. Accordingly, the manufacturing process of the display panel may be simplified, and the production efficiency of the display panel may be improved.

Still referring to FIG. 27, in one embodiment, the display panel includes a substrate 00, a first metal layer M1, a second metal layer M2, and a third metal layer M3. The first metal layer M1, the second metal layer M2, and the third metal layer M3 are disposed on one side of the substrate 00. Each metal layer is separated by an insulating layer. Along a direction perpendicular to a plane where the substrate is located, the first metal layer M1 is located between the substrate 00 and the second metal layer M2, and the third metal layer M3 is located on a side of the second metal layer M2 away from the substrate. The metal conductivity of the second metal layer M2 is greater than the metal conductivity of the first metal layer M1 and/or the third metal layer M3. The first portion 111 is disposed in the second metal layer M2.

Optionally, the display panel also includes an active layer 90. The active layer 90 may be located on a side of the first metal layer M1 away from the substrate 00, or on a side of the first metal layer M1 facing the substrate 00. In one embodiment, the active layer 90 is disposed on the side of the first metal layer M1 facing the substrate 00. The first metal layer M1 may be, for example, a gate metal layer, and gates of transistors in the display panel may be disposed on the first metal layer M1. At least one of the source electrode and the drain electrode of the transistor in the display panel may be disposed on the second metal layer M2. The active layer 90 includes a source region and a drain region formed by doping N-type impurity ions or P-type impurity ions. The source electrode of the transistor may be electrically connected to the source region of the active layer 90 through a contact via. The drain electrode of the transistor may be electrically connected to the drain region of the active layer 90 through the contact via. Optionally, the source electrode of the transistor corresponds to the first electrode or the second electrode of the transistor in the disclosed embodiments of the present disclosure, and the drain electrode of the transistor corresponds to the second electrode or the first electrode of the transistor in the disclosed embodiments of the present disclosure.

In one embodiment, the metal conductivity of the second metal layer M2 is greater than the metal conductivity of the first metal layer M1; alternatively, the metal conductivity of the second metal layer M2 is greater than the metal conductivity of the third metal layer M3; alternatively, the metal conductivity of the second metal layer M2 is greater than the metal conductivity of the first metal layer M1 and the third metal layer M3 simultaneously. That is, the second metal layer M2 is a film layer with higher metal conductivity. In one embodiment, the first portion 111 of the first scan line 11 is disposed on the second metal layer M2 with higher metal conductivity. No additional film layers in the display panel are needed for disposing of the first portion 111. The first portion 111 and circuit traces in the second metal layer M2 may be manufactured in a same process. Accordingly, while improving the metal conductivity of the first portion 111, the film-layer structure of the display panel may be simplified.

In one embodiment, when the metal conductivity of the second metal layer M2 is greater than the metal conductivity of the first metal layer M1, the data line 20 may be disposed on the first metal layer M1. When the metal conductivity of the second metal layer M2 is greater than the metal conductivity of the third metal layer M3, the data line 20 may be disposed in the third metal layer M3. When the metal conductivity of the second metal layer M2 is greater than the metal conductivity of the first metal layer M1, and greater than the metal conductivity of the third metal layer M3, the data line 20 may be disposed on the first metal layer M1 and/or the third metal layer M3.

In existing technologies, the data lines are usually disposed on the second metal layer with higher metal conductivity, and the scan lines are disposed on the first metal layer with lower metal conductivity. In one embodiment of the present disclosure, to improve the metal conductivity of the first scan line 11, the first portion 111 of the first scan line 11 may be disposed on the second metal layer M2 with higher metal conductivity, or the first scan line 11 may be entirely disposed on the second metal layer M2 with higher metal conductivity.

When the first scan line 11 is entirely disposed on the second metal layer M2, the film layer of the data line 20 originally disposed on the second metal layer M2 may need to be replaced. In practical applications, the film layer for the data line 20 may be selected according to difference in metal conductivity among the second metal layer M2, the first metal layer M1, and the third metal layer M3. For example, when the metal conductivity of the second metal layer M2 is greater than the metal conductivity of the first metal layer M1, the data line 20 may be disposed on the first metal layer M1 with smaller metal conductivity. When the metal conductivity of the second metal layer M2 is greater than the metal conductivity of the third metal layer M3, the data line 20 may be disposed on the third metal layer M3 with smaller metal conductivity. When the metal conductivity of the second metal layer M2 is greater than the metal conductivity of the first metal layer M1 and the third metal layer M3 simultaneously, the data line 20 may be disposed on the first metal layer M1 or on the third metal layer M3.

A process of entirely disposing the first scan line 11 on the second metal layer M2 and disposing the data line 20 on the first metal layer M1 or the third metal layer M3 only needs to replace the fabrication sequences of the data line 20 and the first scan line 11, and electrically connect the first scan line 11 to the gate G of the first transistor T1. The gate of the first transistor is still disposed on the first metal layer M1 with lower metal conductivity. Accordingly, while improving the metal conductivity of the first scan line 11 and avoiding changes in characteristics of the first transistor, the manufacturing difficulty of the display panel may not be increased.

Figure 35:
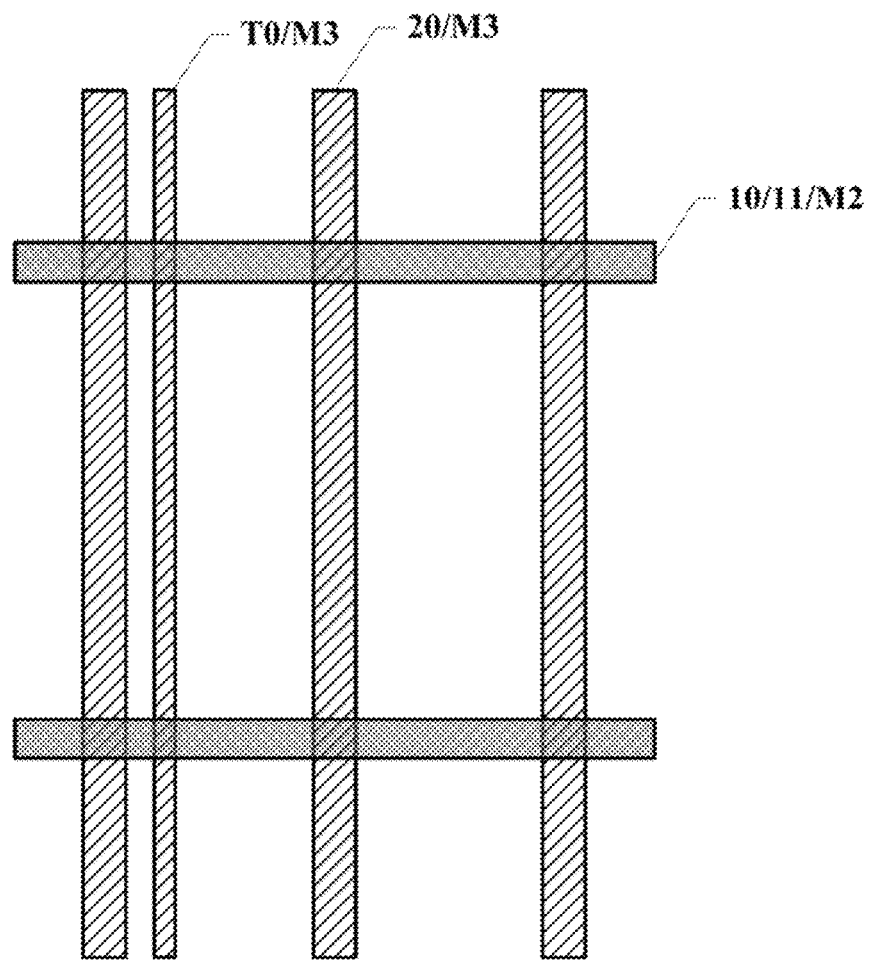
FIG. 35 illustrates another schematic layout diagram of a data line and a touch line in a display panel consistent with the disclosed embodiments of the present disclosure.

FIG. 35 illustrates another schematic layout diagram of a data line and a touch line in a display panel consistent with the disclosed embodiments of the present disclosure. Referring to FIGS. 27, 32 and 35, in one embodiment, the display panel also includes a touch electrode T and a touch line T0 electrically connected to the touch electrode T. The touch electrode T is disposed on a side of the third metal layer M3 away from the substrate 00. The touch line T0 is disposed on the third metal layer M3.

FIG. 32 only uses an example that the touch electrodes in the display panel are self-capacitive touch electrodes, but does not limit types of the touch electrodes. In some other embodiments of the present disclosure, the touch electrodes may also be mutual-capacitive touch electrodes. The touch electrodes T may transmit touch signals through the touch lines T0.

When the display panel includes the third metal layer M3, the data line 20 and the touch line T0 may each be disposed on the third metal layer M3. In this case, the data line 20 and the touch line T0 may be manufactured by using a same mask plate in a same manufacturing process. Accordingly, the manufacturing process of the display panel may be simplified, and the production efficiency of the display panel may be improved.

Figure 36:
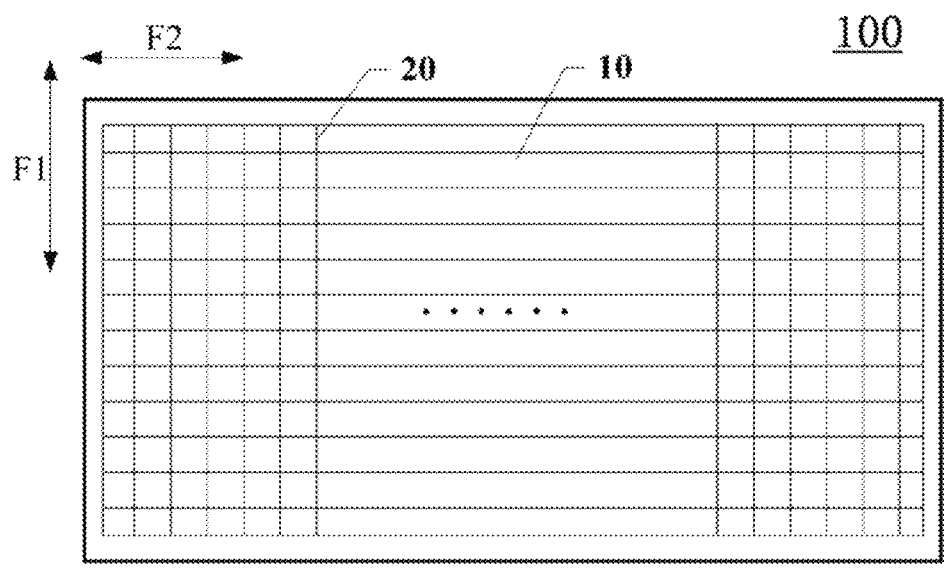
FIG. 36 illustrates another schematic structural diagram of a display panel consistent with the disclosed embodiments of the present disclosure.

FIG. 36 illustrates another schematic structural diagram of a display panel consistent with the disclosed embodiments of the present disclosure. Referring to FIG. 36, in one embodiment, the length of the display panel along the second direction F2 is greater than the length of the display panel along the first direction F1. The first direction F1 is the extending direction of the data lines 20, and the second direction F2 is the extending direction of the scan lines 10.

Specifically, in one embodiment, the display panel is a display panel with a wide screen structure. The length of the display panel along the second direction is larger than the length of the display panel along the first direction. This type of display panel may be suitable for displaying products with larger screens, such as vehicle display products. When the length of the display panel along the second direction is larger, the length of the scan line 10 may be longer. The quantity of sub-pixels connected to each scan line 10 may also be large, and thus a problem of insufficient driving capability for the sub-pixels may arise. For example, a display panel with a wide-screen structure may have a problem of uneven display in the left area, middle area, and right area of the panel.

In the present disclosure, the metal conductivity of the first portion of the first scan line 11 is set to be relatively large. As such, the overall impedance of the first scan line 11 may be reduced, and the uniformity of the driving signal transmitted through the first scan line 11 may be improved. Accordingly, the overall display uniformity of the sub-pixels in the display panel may be improved, and the display in the left area, the middle area and the right area of the display panel with a wide screen structure may be more uniform.

Figure 37:
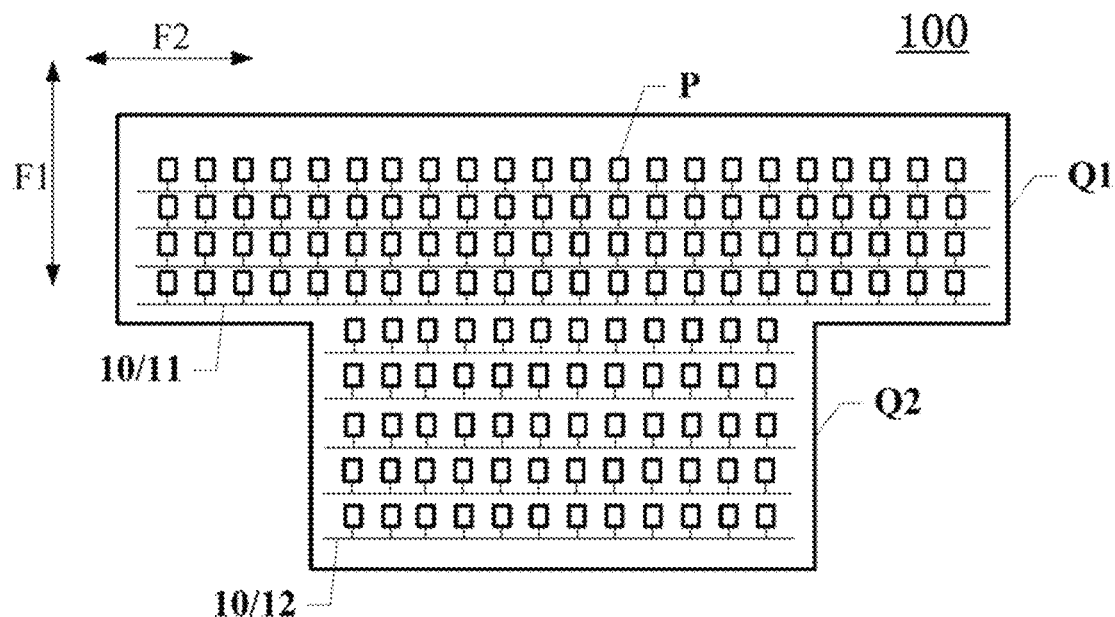
FIG. 37 illustrates another schematic structural diagram of a display panel consistent with the disclosed embodiments of the present disclosure.
Figure 38:
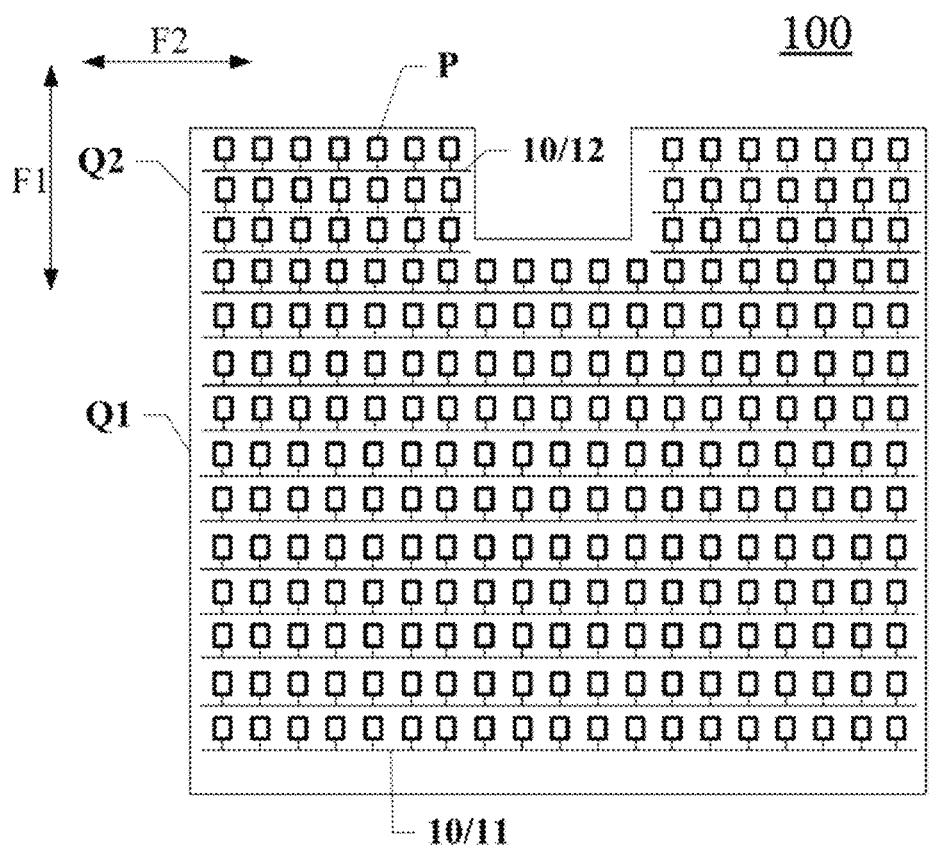
FIG. 38 illustrates another schematic structural diagram of a display panel consistent with the disclosed embodiments of the present disclosure.

FIG. 37 illustrates another schematic structural diagram of a display panel consistent with the disclosed embodiments of the present disclosure. FIG. 38 illustrates another schematic structural diagram of a display panel consistent with the disclosed embodiments of the present disclosure. Referring to FIGS. 37 and 38, in one embodiment, the display panel includes a plurality of sub-pixels P, and the display panel also includes a second scan line 12. A quantity of the sub-pixels P connected to one first scan line 11 is greater than a quantity of sub-pixels P connected to one second scan line 12. The metal conductivity of the first scan line 11 is greater than the metal conductivity of the second scan line 12.

Specifically, referring to FIGS. 37 and 38, in the display panel, the quantity of the sub-pixels P connected to the first scan line 11 is relatively large, and the quantity of the sub-pixels P connected to the second scan line 12 is relatively small. In this configuration, loads of the first scan line 11 and the second scan line 12 may be different. For example, the load of the first scan line 11 is relatively large and the driving capability is relatively weak; and the load of the second scan line 12 is relatively small and the driving capability is relatively strong. As a result, display differences may appear in regions of the sub-pixels connected to the first scan line and the second scan line respectively. For this reason, in one embodiment of the present disclosure, the metal conductivity of the first scan line 11 is set to be greater than the metal conductivity of the second scan line 12. As such, the impedance of the first scan line 11 may be reduced, and the load on the first scan line 11 may thus be reduced. Accordingly, the load difference between the first scan line 11 and the second scan line 12 may be reduced, and the display uniformity of the sub-pixels connected to the first scan line 11 and the second scan line 12 respectively, may be improved.

It should be noted that FIGS. 37 and 38 show two types of display panels with special-shaped structures, but do not limit specific structures of the display panels. When the display panel has other special-shaped structures, such as circular or elliptical structures, the quantities of the sub-pixels connected to two scan lines respectively, may be different. In some other embodiments of the present disclosure, the display panel may have a conventional structure such as a rectangle. When the quantities of the sub-pixels connected to different scan lines are different, resulting in load differences, the method provided by the present disclosure may also be used to balance the load differences between different scan lines.

Still referring to FIGS. 37 and 38, in one embodiment, the display area of the display panel includes a first area Q1 and a second area Q2 arranged along the first direction F1. A width of the first region Q1 along the second direction F2 is greater than a width of the second region Q2 along the second direction F2. The first scan line 11 is disposed in the first area Q1, and the second scan line 12 is disposed in the second area Q2. The first direction F1 is the extending direction of the data lines 20, and the second direction F2 is the extending direction of the scan lines 10.

Specifically, the display panels shown in FIGS. 37 and 38 each have a special-shaped structure. The special-shaped panel may include regions with different widths. As such, the lengths of the scan lines may be different, and the quantities of the sub-pixels P connected to the scan lines may be different. In one embodiment, the width of the first region Q1 along the second direction F2 is larger, and the width of the second region Q2 along the second direction F2 is smaller. In this configuration, the length of the first scan line 11 located in the first region Q1 is longer, and the quantity of the sub-pixels P connected to the first scan line 11 is larger. The length of the second scan line 12 located in the second region Q2 is shorter, and the quantity of the sub-pixels P connected to the second scan line 12 is small. When the metal conductivity of the first scan line 11 is set to be larger, the impedance of the first scan line 11 with a longer length may be reduced. Accordingly, the load of the first scan line 11 may be reduced, and the load difference between the scan lines in the first area Q1 and the second area Q2 may be balanced. Accordingly, the display uniformity of the first area Q1 and the second area Q2 may be improved, and the overall display effect of the display panel may be improved.

Figure 39:
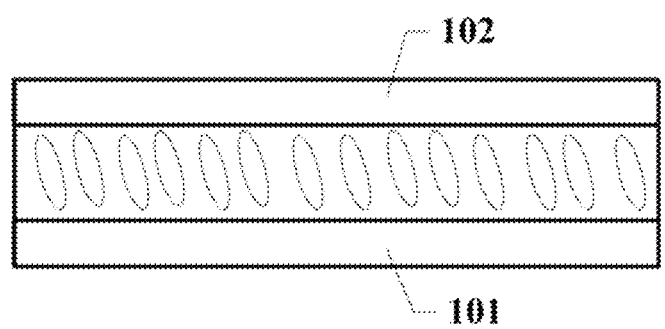
FIG. 39 illustrates a cross-sectional view of a liquid crystal display panel consistent with the disclosed embodiments of the present disclosure.

In one embodiment, the display panel is a liquid crystal display panel. FIG. 39 illustrates a cross-sectional view of a liquid crystal display panel consistent with the disclosed embodiments of the present disclosure. Referring to FIG. 39 in conjunction with FIG. 27, the display panel is a liquid crystal display panel. The liquid crystal display panel includes an array substrate 101 and a color filter substrate 102 disposed opposite to each other, and liquid crystals filled between the array substrate 101 and the color filter substrate 102. The liquid crystal display panel also includes scan lines and data lines. The scan lines and the data lines are disposed on the array substrate 101.

The array substrate 101 in the liquid crystal display panel may have a simple film-layer structure. In one embodiment, the scan line 10 is disposed on the second metal layer M2, and the data line 20 is disposed on the first metal layer M1 or the third metal layer M3. The electrical connection between the scan line 10 and the gate G of the first transistor T1 may be achieved through a via. As such, complexity of the manufacturing process of the display panel may not be increased.

In some other embodiments of the present disclosure, the display panel may also be an organic electroluminescent display panel, or an inorganic light emitting diode display panel, etc. By increasing the metal conductivity of the first scan line, the impedance of scan line may also be reduced. Accordingly, the driving uniformity of the scan line to the sub-pixels connected to the scan line may be improved, and the overall display uniformity of the display panel may thus be improved.

Figure 40:
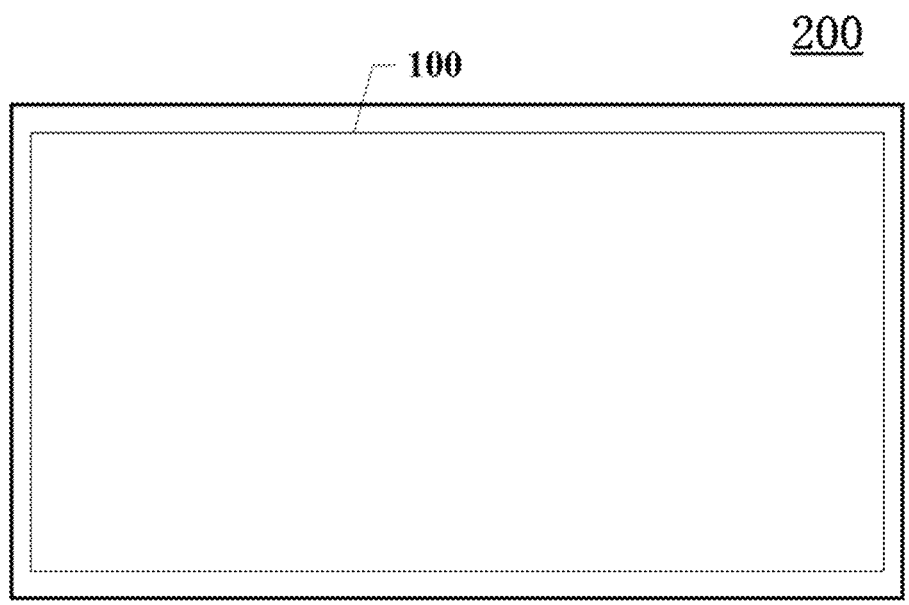
FIG. 40 illustrates a schematic structural diagram of a display device consistent with the disclosed embodiments of the present disclosure.

The present disclosure also provides a display device. FIG. 40 illustrates a schematic structural diagram of a display device consistent with the disclosed embodiments of the present disclosure. Referring to FIG. 40, the display device includes a display panel provided by the present disclosure.

The display device provided by the present disclosure may be a computer, a mobile phone, a tablet and other display devices with a display function, and may be especially suitable for a display device with a wide-screen structure, such as a vehicle-mounted display device. The present disclosure does not limit applications of the display device. The display device provided by the present disclosure has beneficial effects of the display panel provided by the present disclosure. For details, reference may be made to specific descriptions of the display panels in the present disclosure, and the present disclosure will not go into details here.

As disclosed, the technical solutions of the present disclosure have the following advantages.

The display panel and the display device provided by the present disclosure include a plurality of data lines and a plurality of scan lines. Extending directions of the data lines and the scan lines intersect. The scan line includes at least one first scan line. The first scan line includes a first portion. The first portion may be understood as at least a part of line segments of the first scan line. In particular, the metal conductivity of the first portion of the first scan line is greater than or equal to the metal conductivity of the data line. As such, the overall metal conductivity of the first scan line may be increased, and the overall impedance of the first scan line may be decreased. Optionally, one scan line may be electrically connected to a plurality of sub-pixels. When the overall impedance of the first scan line is reduced, the difference in driving signals received by different sub-pixels connected to a same first scan line may be decreased.

Accordingly, while the driving capability may be improved, the driving uniformity and the overall display uniformity may also be improved.

The embodiments disclosed herein are exemplary only and not limiting the scope of the present disclosure. Various combinations, alternations, modifications, equivalents, or improvements to the technical solutions of the disclosed embodiments may be obvious to those skilled in the art. Without departing from the spirit and scope of this disclosure, such combinations, alternations, modifications, equivalents, or improvements to the disclosed embodiments are encompassed within the scope of the present disclosure.

What is claimed is:

1. A display panel, comprising a plurality of data lines and a plurality of scan lines,
  wherein:
    an extending direction of the plurality of data lines intersects an extending direction of the plurality of scan lines;
    the plurality of scan lines includes at least one first scan line;
    the first scan line includes a first portion; and
    a metal conductivity of the first portion is greater than or equal to a metal conductivity of the plurality of data lines,
  wherein the display panel further comprises a plurality of first transistors and a plurality of pixel electrodes, wherein:
    a gate of a first transistor of the plurality of first transistors is electrically connected to the first scan line;
    a first electrode of the first transistor is electrically connected to a data line of the plurality of data lines;
    a second electrode of the first transistor is electrically connected to a pixel electrode of the plurality of pixel electrodes; and
    a metal conductivity of the gate of the first transistor is smaller than the metal conductivity of the first portion of the first scan line, and
  wherein:
    the first transistor includes a first sub-transistor and a second sub-transistor;
    within one first transistor of the first transistor, a first gate of the first sub-transistor and a second gate of the second sub-transistor are electrically connected to a same first scan line of the first scan line;
    a first electrode of the first sub-transistor is electrically connected to the data line;
    a second electrode of the first sub-transistor is electrically connected to a first electrode of the second sub-transistor; and
    a second electrode of the second sub-transistor is electrically connected to the pixel electrode.

2. The display panel according to claim 1, wherein:
  each of the plurality of scan lines is the first scan line; or
  the display panel further comprises a bonding area, wherein the bonding area includes a plurality of conductive pads, and the plurality of the conductive pads is electrically connected to the plurality of scan lines, and the display panel further comprises a second scan line, wherein the second scan line is disposed between the first scan line and the bonding area along an extending direction of the plurality of data lines, and the metal conductivity of the first portion is greater than or equal to a metal conductivity of the second scan line.

3. The display panel according to claim 1, wherein:
  the gate of the first transistor and the first portion of the first scan line are disposed in different layers; and
  the gate of the first transistor is connected to the first scan line through a connection via.

4. The display panel according to claim 1, wherein:
  the gate of the first transistor includes an extension portion;
  the extension portion is located on at least one side of the gate along an extending direction of the gate;
  along a thickness direction of the display panel, the first scan line overlaps with the extension portion; and
  the first scan line is connected to the extension portion through a connection via.

5. The display panel according to claim 1, wherein:
  a connection portion electrically connected to the gate is disposed on a film layer where the gate is located;
  the connection portion and the first scan line are located on a same side of the gate along a first direction, wherein the first direction is same as an extending direction of the data lines;
  along the thickness direction of the display panel, the connection portion overlaps with the first scan line; and
  the first scan line is connected to the connection portion through a connection via.

6. The display panel according to claim 1, wherein:
  within one first transistor of the first transistor, the first gate and the second gate are electrically connected through a first connection portion, and along an arrangement direction of the first gate and the second gate, the first connection portion is disposed between the first gate and the second gate;
  the first gate includes a first extension portion on a side of the first gate away from the first connection portion, and the second gate includes a second extension portion on a side of the second gate away from the first connection portion;
  the first extension portion is electrically connected to the first scan line through a first connection via, and the second extension portion is electrically connected to the first scan line through a second connection via;
  a minimum distance between the first connection via and the data line connected to the first sub-transistor is D0, with D0≥1.5 μm; and
  a minimum distance between the second connection via and the data line adjacent to the second connection via is D1, with D1≥1.5 μm.

7. The display panel according to claim 1, wherein:
  within one first transistor of the first transistor, the first gate and the second gate are electrically connected through a first connection portion, and along an arrangement direction of the first gate and the second gate, the first connection portion is disposed between the first gate and the second gate;
  the first gate includes a first extension portion on a side of the first gate away from the first connection portion, and the second gate includes a second extension portion on a side of the second gate away from the first connection portion; and
  the first connection portion is electrically connected to the first scan line through a first connection via, and at least one of the first extension portion and the second extension portion is electrically connected to the first scan line through a second connection via.

8. The display panel according to claim 1, wherein:
  within one first transistor of the first transistor, the first gate and the second gate are electrically connected through a second connection portion, the second connection portion is disposed on a same side of the first gate and the second gate along a first direction, the first direction intersects an arrangement direction of the first gate and the second gate, the first direction is same as an extending direction of the data lines, and the second connection portion is electrically connected to the first scan line through two or more connection vias; and along a thickness direction of the display panel, the first scan line does not overlap with an active layer of the first transistor, or along the first direction, the first scan line is disposed between the first electrode and the second electrode in the first transistor, wherein the first electrode is connected to the data line, the second electrode connected to the pixel electrode, and the first direction is same as the extending direction of the data line.

9. The display panel according to claim 1, wherein an active layer of the first transistor is U-shaped, I-shaped, or L-shaped.

10. The display panel according to claim 1, wherein:
the first portion of the first scan line is on a same layer as the second electrode of the first transistor, and along an arrangement direction of the first portion and the second electrode, a distance between the first portion and the second electrode is D2, with D2>1.5 µm; and
when D2<3 µm, a length x of the second electrode along a second direction is smaller than a length y of the second electrode along a first direction, wherein the first direction is an extending direction of the data lines, and the second direction is an extending direction of the scan lines, or when D2>3 µm, a length x of the second electrode along a second direction is greater than a length y of a second electrode along the first direction, wherein the first direction is an extending direction of the data lines, and the second direction is an extending direction of the scan lines.

11. The display panel according to claim 1, wherein:
a length of the display panel along a second direction is greater than a length of the display panel along a first direction, and the first direction is an extending direction of the data lines, and the second direction is an extending direction of the scan lines; or
the display panel further comprises a plurality of sub-pixels and a second scan line, wherein a quantity of sub-pixels of the plurality of sub-pixels connected to one first scan line is greater than a quantity of the sub-pixels connected to one second scan line of the second scan line, metal conductivity of the first scan line is greater than metal conductivity of the second scan line, a display area of the display panel includes a first area and a second area arranged along a first direction, a width of the first region along a second direction is greater than a width of the second region along the second direction, the first scan line is disposed in the first area, the second scan line is disposed in the second area, the first direction is an extending direction of the data lines, and the second direction is an extending direction of the scan lines.

12. A display device, comprising a display panel, wherein the display panel includes: a plurality of data lines and a plurality of scan lines,
wherein:
an extending direction of the plurality of data lines intersects an extending direction of the plurality of scan lines;
the plurality of scan lines includes at least one first scan line;
the first scan line includes a first portion; and
a metal conductivity of the first portion is greater than or equal to a metal conductivity of the plurality of data lines,
wherein the display panel further comprises a plurality of first transistors and a plurality of pixel electrodes, wherein:
a gate of a first transistor of the plurality of first transistors is electrically connected to the first scan line;
a first electrode of the first transistor is electrically connected to a data line of the plurality of data lines;
a second electrode of the first transistor is electrically connected to a pixel electrode of the plurality of pixel electrodes; and
a metal conductivity of the gate of the first transistor is smaller than the metal conductivity of the first portion of the first scan line, and
wherein:
the first transistor includes a first sub-transistor and a second sub-transistor;
within one first transistor of the first transistor, a first gate of the first sub-transistor and a second gate of the second sub-transistor are electrically connected to a same first scan line of the first scan line;
a first electrode of the first sub-transistor is electrically connected to the data line;
a second electrode of the first sub-transistor is electrically connected to a first electrode of the second sub-transistor; and
a second electrode of the second sub-transistor is electrically connected to the pixel electrode.

* * * * *